US007369856B2

(12) United States Patent
Ovadia

(10) Patent No.: US 7,369,856 B2
(45) Date of Patent: May 6, 2008

(54) METHOD AND SYSTEM TO SUPPORT FAST HAND-OVER OF MOBILE SUBSCRIBER STATIONS IN BROADBAND WIRELESS NETWORKS

(75) Inventor: Shlomo Ovadia, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 140 days.

(21) Appl. No.: 10/997,336

(22) Filed: Nov. 24, 2004

(65) Prior Publication Data

US 2006/0111111 A1 May 25, 2006

(51) Int. Cl.
*H04Q 7/20* (2006.01)
(52) U.S. Cl. .................. 455/439; 455/437; 455/438; 455/442; 455/443
(58) Field of Classification Search ............. 455/439, 455/436, 432.2, 461; 370/331, 338, 395.21, 370/252; 709/224, 228
See application file for complete search history.

(56) References Cited

U.S. PATENT DOCUMENTS

| 5,101,509 | A | | 3/1992 | Lai |
| 6,606,310 | B1 | * | 8/2003 | Vialen et al. ............... 370/338 |
| 2003/0112766 | A1 | | 6/2003 | Riedel et al. |
| 2003/0167319 | A1 | * | 9/2003 | Venkatesulu et al. ....... 709/223 |
| 2004/0103282 | A1 | | 5/2004 | Meier et al. |
| 2004/0198220 | A1 | | 10/2004 | Whelan et al. |
| 2004/0203788 | A1 | * | 10/2004 | Fors et al. ................... 455/439 |
| 2005/0143072 | A1 | * | 6/2005 | Yoon et al. .................. 455/436 |
| 2005/0266848 | A1 | * | 12/2005 | Kim ........................... 455/436 |
| 2006/0111112 | A1 | * | 5/2006 | Maveddat .................... 455/439 |

FOREIGN PATENT DOCUMENTS

WO    WO 02/23930 A1    3/2002

(Continued)

OTHER PUBLICATIONS

Shlomo Ovadia, "Method and Apparatus to Authenticate Base and Subscriber Stations and Secure Sessions for Broadband Wireless Networks," U.S. Appl. No. 10/878,713, filed on Jun. 28, 2004.

(Continued)

*Primary Examiner*—Duc M. Nguyen
*Assistant Examiner*—Dai Phuong
(74) *Attorney, Agent, or Firm*—Blakely, Sokoloff, Taylor & Zafman LLP

(57) ABSTRACT

Method and system to support fast hand-over of mobile subscriber stations in broadband wireless networks. In connection with a hand-over process, a determination is made to which target base station (BS) an air interface for a mobile subscriber station (MSS) is to be handed-over. Various service requirements are requested by the MSS, including a Quality of Service (QoS) level. Based on feedback from potential target BSs, a target BS for hand-over is selected. Current connection context data corresponding to current service flows provided by a serving BS is passed to the target BS to pre-provision service such that a minimal amount of re-entry messaging is required. In one embodiment, a Management Information Base (MIB) instance is maintained at each BS in a broadband wireless network. To pre-provision service, applicable connection context data are transferred between MIB instances at the serving and target BS using Simple Network Management Protocol (SNMP) messaging.

27 Claims, 14 Drawing Sheets

FOREIGN PATENT DOCUMENTS

WO     WO 2004/086690 A1     10/2004
WO   PCT/US2005/041561     6/2007

OTHER PUBLICATIONS

PCT/US2005/041561, PCT International Search Report and Written Opinion of the International Searching Authority, Nov. 6, 2006.

Manner, J. et al., "Mobility Related Terminology; draft-manner-seamoby-terms-02.txt," IETF Standard-Working Draft, Internet Engineering Task Force, IETF, CH, No. 2, Jul. 8, 2001, pp. 1-28.

Manner, J. et al., "Mobility Related Terminology," IETF Standard, Internet Engineering Task Force, IETF, CH, Jun. 2004, pp. 1-36.

PCT/US2005/041561, PCT Invitation to Pay Additional Fees, Jul. 5, 2006.

Part 16: Air Interface for Fixed and Mobile Broadband Wireless Access Systems, Amendment for Physical and Medium Access Control Layers for Combined Fixed and Mobile Operation in Licensed Bands, IEEE, P802.16e/D5, Sep. 2004, pp. 4-338.

* cited by examiner

Fig. 6a

| sfIndex | SS MAC Addr | QoS Index | Direction | ... |
|---|---|---|---|---|
| 100001 | 123ab54 | 1 | D | |
| 100002 | 123ab54 | 2 | U | |
| 100003 | 45feda1 | 1 | D | |
| 100004 | 45feda1 | 2 | U | | wmanIfBsProvisionedSfTable

D-Downlink    U-Uplink

Fig. 6b

| QoS Index | Service Class | Traffic Priority | Max Rate | Max Burst | Min Rate | Jitter | Max Latency | ... |
|---|---|---|---|---|---|---|---|---|
| 1 | Gold | 3 | 2000000 | 4M | 200000 | 2.5 | 50 | ... |
| 2 | Silver | 4 | 1000000 | 2M | 100000 | 5 | 100 | ... |
| 3 | Bronze | 6 | 512000 | 1M | 50000 | 10 | 150 | ... | wmanIfBsServiceClassTable

Fig. 6c

| sfIndex | Src IP Addr | Dest IP Addr | TOS/DSCP | ... |
|---|---|---|---|---|
| 100001 | | 1.0.1.48 | | |
| 100003 | | 1.0.1.45 | | |
| 115455 | 6.12.6.4 | | | |
| 100002 | 6.12.6.5 | | 7 | |
| 100004 | 6.12.6.6 | | 4 | | wmanIfBsClassifierRuleTable

METHOD AND SYSTEM TO SUPPORT FAST HAND-OVER OF MOBILE SUBSCRIBER STATIONS IN BROADBAND WIRELESS NETWORKS

FIELD OF THE INVENTION

The field of invention relates generally to wireless communication networks and, more specifically but not exclusively relates to a method and system for fast hand-over of mobile subscriber stations in broadband wireless networks.

BACKGROUND INFORMATION

IEEE (Institute of Electrical and Electronic Engineers) 802.16 is an emerging suite of air interface standards for combined fixed, portable and Mobile Broadband Wireless Access (MBWA). Initially conceived as a radio standard to enable cost-effective last-mile broadband connectivity to those not served by wired broadband such as cable or DSL, the specifications are evolving to target a broader market opportunity for mobile, high-speed broadband applications. The IEEE 802.16 architecture not only addresses the traditional "last mile" problem, but also supports nomadic and mobile clients on the go. The MBWA architecture is being standardized by the IEEE 802.16 Working Group and the Worldwide Interoperability for Microwave Access (WiMAX) forum. For convenience, the terms 802.16 and WiMAX are used interchangeably throughout this specification to refer to the IEEE 802.16 suite of air interface standards.

FIG. 1 shows a simplified broadband wireless network with point-to-multipoint (PMP) cellular-like architecture for operation at both licensed and licensed-exempt frequency bands typically below 11 GHz. Other types of architectures (not shown) such as mesh broadband wireless networks are permissible. A backbone IP (Internet Protocol) network 100 is connected to a broadband wireless network using radio access nodes (RANs) 102A and 102B. Each RAN is connected via a wired link such as an optical fiber (depicted as optical fiber links 103A, 103B and 103C) or point-to-point wireless link (not shown) to one or more radio cells (depicted between RAN 102A or 102B to radio cells 104A, 104B, and 104C. At the hub of a radio cell is a respective Base station (BS) 106A, 106B, and 106C. A Base Station system includes an advanced antenna system (AAS), which is typically located on top of a radio tower and is used to transmit high-speed data to multiple subscriber stations (SSs) 108 and mobile subscriber stations (MSSs) 109 and receive data from the subscriber stations via unidirectional wireless links 110 (each SS uplink transmission is independent on the others). More particularly, each SS 108 can access network 100 (via an appropriate BS) using the PHY+MAC (Physical+Media Access Control) layer features defined by the IEEE P802.16 air-interface standard. An SS may correspond to a fixed subscriber location (e.g., in a home or office), or may correspond to a mobile subscriber who might access the broadband wireless network via a mobile device (MSS) such as a personal digital assistant (PDA), laptop computer, etc. A fixed SS typically uses a directional antenna while an MSS usually uses an omnidirectional antenna.

Transmission of data bursts from network 100 to an SS 108 proceeds in the following manner. The data bursts such as IP packets or Ethernet frames are encapsulated in IEEE 802.16-2004 data frame format and forwarded from an appropriate RAN to an appropriate BS within a given cell. The BS then transmits non-line-of-sight (NLOS) data to each SS 108 using a unidirectional wireless link 110, which is referred to as a "downlink." Transmission of data from an SS 108 to network 100 proceeds in the reverse direction. In this case, the encapsulated data is transmitted from an SS to an appropriate BS using a unidirectional wireless link referred to as an "uplink." The data packets are then forwarded to an appropriate RAN, converted to IP Packets or Ethernet frames, and transmitted henceforth to a destination node in network 100. Data bursts can be transmitted using either Frequency-Division-Duplexing (FDD) or Time-Division-Duplexing (TDD) schemes. In the TDD scheme, both the uplink and downlink share the same RF channel, but do not transmit simultaneously, and in the FDD scheme, the uplink and downlink operate on different RF channels, but the channels are transmitted simultaneously.

Multiple BSs are configured to form a cellular-like wireless network. A network that utilizes a shared medium requires a mechanism to efficiently share it. Within each cell, the wireless network architecture is a two-way PMP, which is a good example of a shared medium; here the medium is the space (air) through which the radio waves propagate. The downlink, from the base station (BS) to an SS, operates on a PMP basis. Provisions within the IEEE 802.16-2004 standard include a central BS with AAS within each cell. Such an AAS includes a sectorized antenna that is capable of handling multiple independent sectors simultaneously. Under this type of configuration, the operations of base stations described below may be implemented for each of the independent sectors, such that multiple co-located base stations with multiple sector antennas sharing a common controller may be employed in the network. Within a given frequency channel and antenna sector, all stations receive the same transmission, or parts thereof.

In the other direction, the subscriber stations share the uplink to the BS on a demand basis. Depending on the class of service utilized, the SS may be issued continuing rights to transmit, or the right to transmit may be granted by the BS after receipt of a request from an SS. In addition to individually-addressed messages, messages may also be sent on multicast connections (control messages and video distribution are examples of multicast applications) as well as broadcast to all stations. Within each sector, users adhere to a transmission protocol that controls contention between users and enables the service to be tailored to the delay and bandwidth requirements of each user application.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 6a shows an exemplary configuration for a wireless MAN (metropolitan area network) BS provisioned service flow table corresponding to the wmanIfBsProvisionedSfTable object of FIG. 5, according to one embodiment of the invention;

FIG. 6b shows an exemplary configuration for a wireless MAN BS service class table corresponding to the wmanIfBsServiceClassTable object of FIG. 5, according to one embodiment of the invention;

FIG. 6c shows an exemplary configuration for a wireless MAN BS classifier rule table corresponding to the wmanIfBsClassifierRuleTable object of FIG. 5, according to one embodiment of the invention;

DETAILED DESCRIPTION

Figure 1:
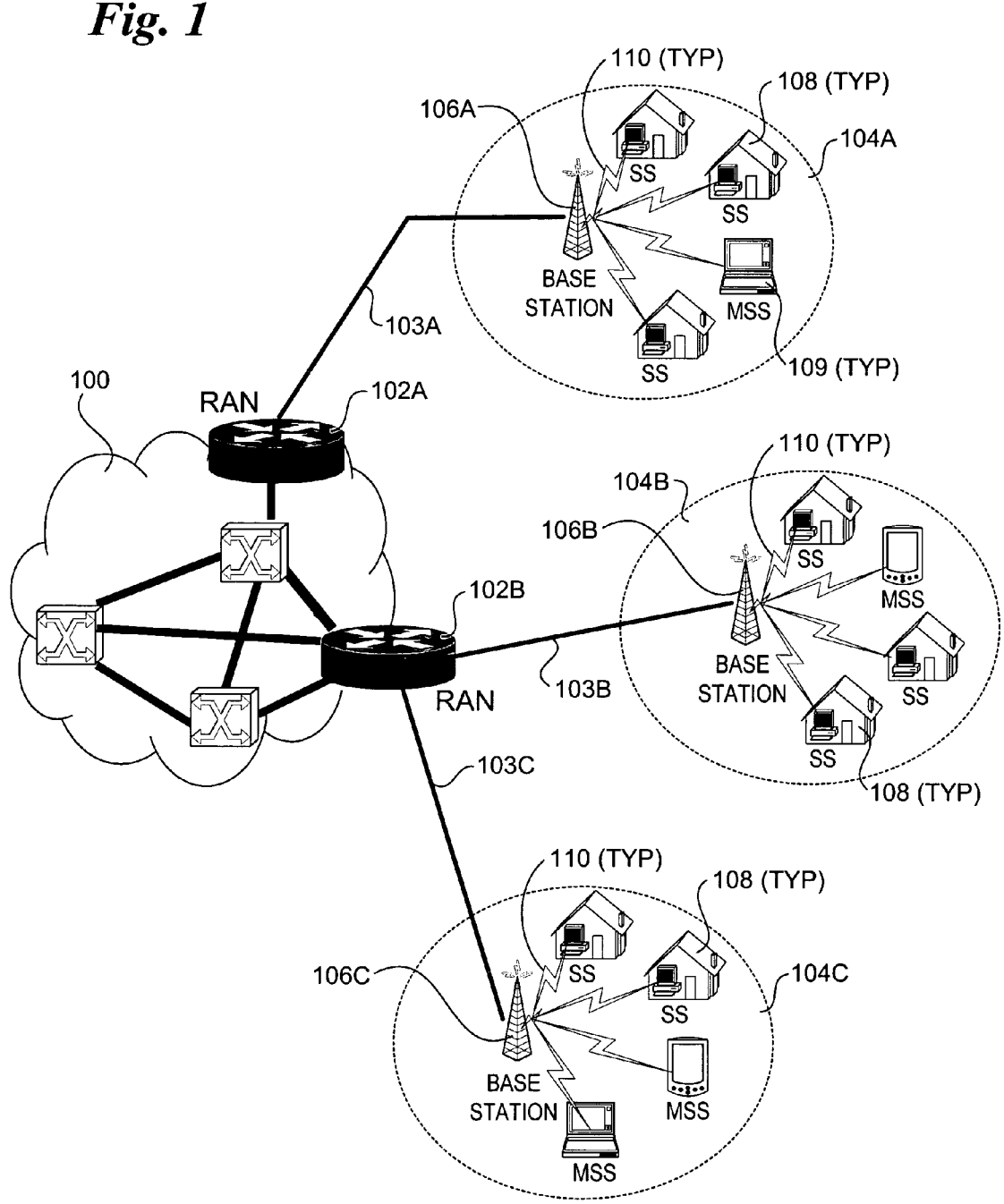
FIG. 1 is a schematic diagram of an exemplary broadband wireless network with point-to-multipoint topology based on the IEEE 802.16 suite of standards.

Embodiments of methods and apparatus for supporting fast hand-over of mobile subscriber stations in broadband wireless networks are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

One of the more important aspects designed into 802.16-based broadband wireless networks is the ability to support mobile subscribers. Notably, this is one of the weak links with present cellular-based networks. While modern "2½ G" and "3 G" cellular services enable subscribers to receive and send data from mobile platforms, the transmission rates are relatively poor. A significant reason for this is that the underlying delivery mechanisms (the cellular networks) were originally intended for voice communication, which requires relatively low transmission rates.

The MBWA architecture being standardized by the IEEE 802.16 Working Group and the WiMAX forum is targeted to provide support for high transmission rates for mobile subscribers. At the same time, the MBWA architecture has also been designed to support the rich service capabilities such as high-speed data, streaming videos, and voice-over-IP (VoIP) services that were originally targeted for fixed subscriber stations to fulfill the "last mile" service requirements.

An important aspect of WiMAX networks is service provisioning. To enable end-user access to a WiMAX network, the user's SS and service flows (i.e., unidirectional flow of MAC service data units on a connection with a particular quality of service (QoS)) must be provisioned. Unlike the limited QoS support provided by the more simplistic Wi-Fi (i.e., IEEE 802.11) networks commonly used to provide wireless network access in today's environments, the IEEE 802.16-based network architecture supports a rich set of QoS features. Furthermore, WiMAX networks employs a more sophisticated wireless air-interface than does Wi-Fi that support a "true" QoS services, and thus requiring more complex service provisioning considerations.

More specifically, WiMAX is based on centralized control architecture, where the scheduler in a given BS has complete control of the wireless media access among all SS's that are currently using that BS for network access. WiMAX-based network architecture can simultaneously support multiple wireless connections that are characterized with a complete set of QoS parameters. Moreover, this architecture provides the packet classifier to map these connections with various user applications and interfaces, ranging from Ethernet, TDM (Time-Division Multiplexing), ATM (Asynchronous Transfer Mode), IP (Internet Protocol), VLAN (Virtual Local Area Network), etc. However, the rich feature set and flexibility in WiMAX also increases the complexity in the service deployment and provisioning for fixed and mobile broadband wireless access networks.

Figure 2:
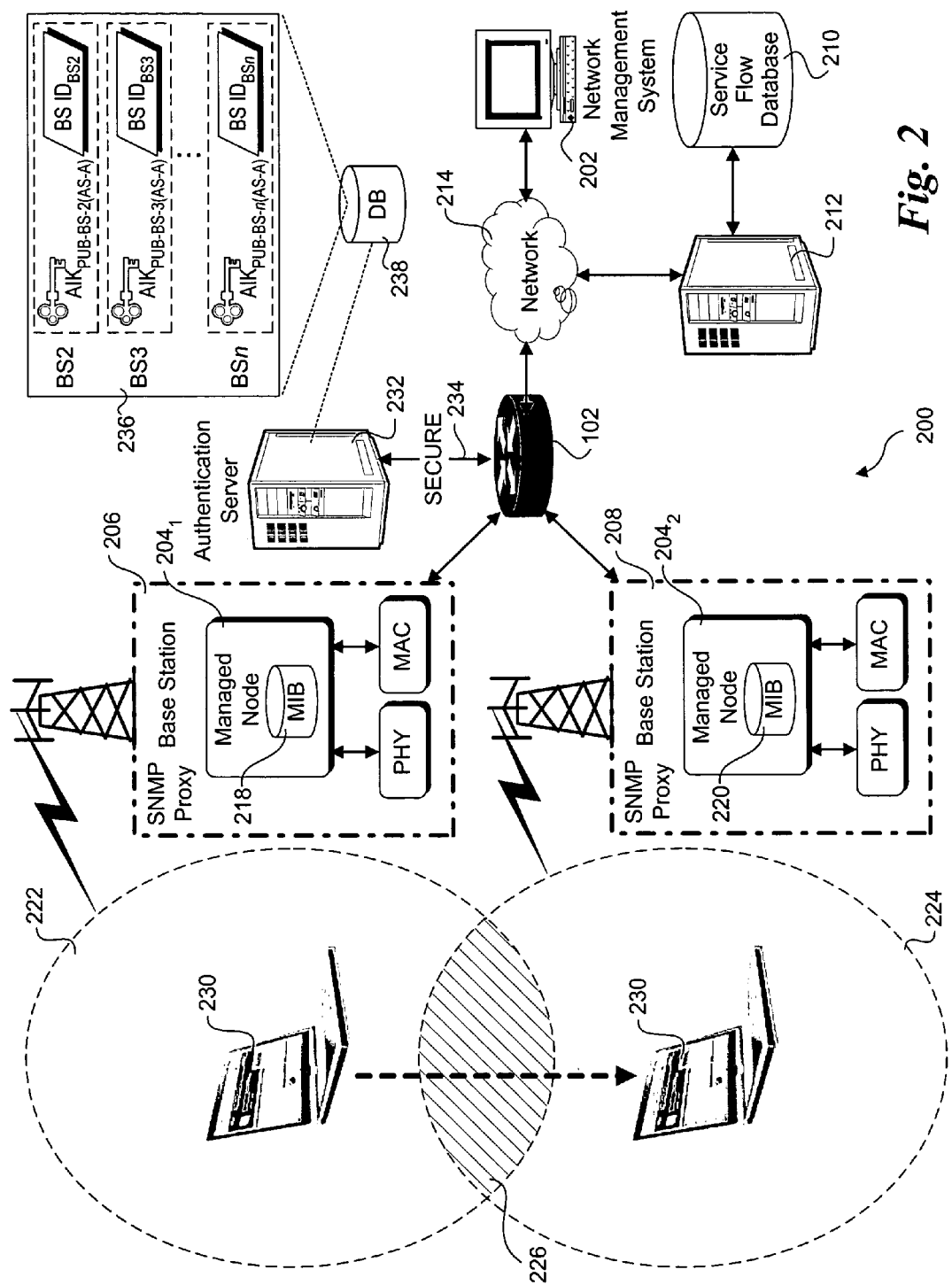
FIG. 2 is a schematic diagram of a broadband wireless network architecture with mobile subscriber stations (MSSs), according to one embodiment of the invention.

FIG. 2 shows a management reference model 200 of Broadband Wireless Access (BWA) networks, according to one embodiment of the invention. The model includes a Network Management System (NMS) 202, managed base station nodes (depicted as managed nodes 204, and 2042 for exemplary base stations 206 and 208), and a Service Flow Database 210 hosted by a database server 212. The NMS 202 and Service Flow Database are linked in communication to the WiMAX network's BSs (e.g., base station 206 and 208) via a network 214, which may typically be a wide-area network (WAN) or public network (e.g., the Internet). The BS managed nodes collect and store managed objects in an 802.16 Management Information Base (MIB) format, as depicted by MIB instances 218 and 220. In one embodiment, managed objects are made available to NMSs (e.g., NMS 202) using the Simple Network Management Protocol (SNMP) as specified by IETF RFC (request for comments) 1157 (i.e., http://www.faqs.org/rfcs/rfc1157.html).

Each of base stations 206 and 208 provide a respective coverage area. The "footprint" (i.e., shape) of each coverage area will general depend on the type of antenna provided (e.g., single sector, multiple sector or omni-directional) by the base station in combination with geographical and/or infrastructure considerations and the power of the radio signal. For example, although referred to as non-line-of-sight (NLOS), geographical terrain such as mountains and trees, and public infrastructure such as large buildings may affect the wireless signal propagation, resulting in a reduced coverage area. The radio signal strength for WiMAX transmissions are also limited by the available RF spectrum for licensed and/or licensed-free operations. For simplicity, the respective coverage areas 222 and 224 for base stations 206 and 208 are depicted as ovals.

A given base station is able to support communication with both MSSs and fixed SSs within its coverage area. In order to support complete mobility, the coverage area of proximate "neighbor" base stations must have some degree of overlap, as depicted by an overlap coverage area 226 in FIG. 2. As an MSS moves throughout the coverage area, its signal-strength data is periodically gathered to assess which BS should be used to best maintain the current level of service. In view of this signal strength data, as well as other considerations detailed below, the BS used to provide services to a given MSS will be switched as the MSS moves within various BS coverage areas via a hand-over (HO) process.

More particularly, the HO process is the process under which an MSS migrates from the air-interface provided by a (currently) serving BS to the air-interface provided by a target (for future service) BS. Upon HO completion, the target BS becomes the new serving BS. Under a conventional HO process, the MSS needs to synchronize with the target BS downlink channel, obtain the uplink parameters and perform its network re-entry process, including re-authorization, re-registration, and re-establish its IP connectivity in a manner similar to that employed for new MSS entering the network according to the IEEE 802.16e/D5-2004 standard. This conventional HO process requires a large amount of message traffic, resulting in a significant time-delay as well as significant workload levels at the BSs.

Embodiments of the invention described herein address the message traffic, BS workload, and other considerations by supporting a fast HO process that eliminates the need for many of the re-entry operations required by the conventional HO process. In particular, connection context information for a current connection between an MSS and serving BS, which includes parameters such as bandwidth and QoS, is forwarded to a target BS to pre-provision service having the same or similar parameters at that BS. Other information, including MSS authentication information and full service and operational state transfer information, may also be forwarded to the target BS to pre-provision the service. By providing forwarding the connection context information directly to the target BS, there is no need for the MSS itself to convey this information to the target BS, thus many of the messaging sequences encountered during a conventional HO process are eliminated. Consequently, the message traffic and BS workload is reduced. Furthermore, smoother HO transitions are supported, wherein a service level provided by a current BS may be seamlessly transitioned to the same service level provided by a target BS with minimum service disruption.

Figure 3:
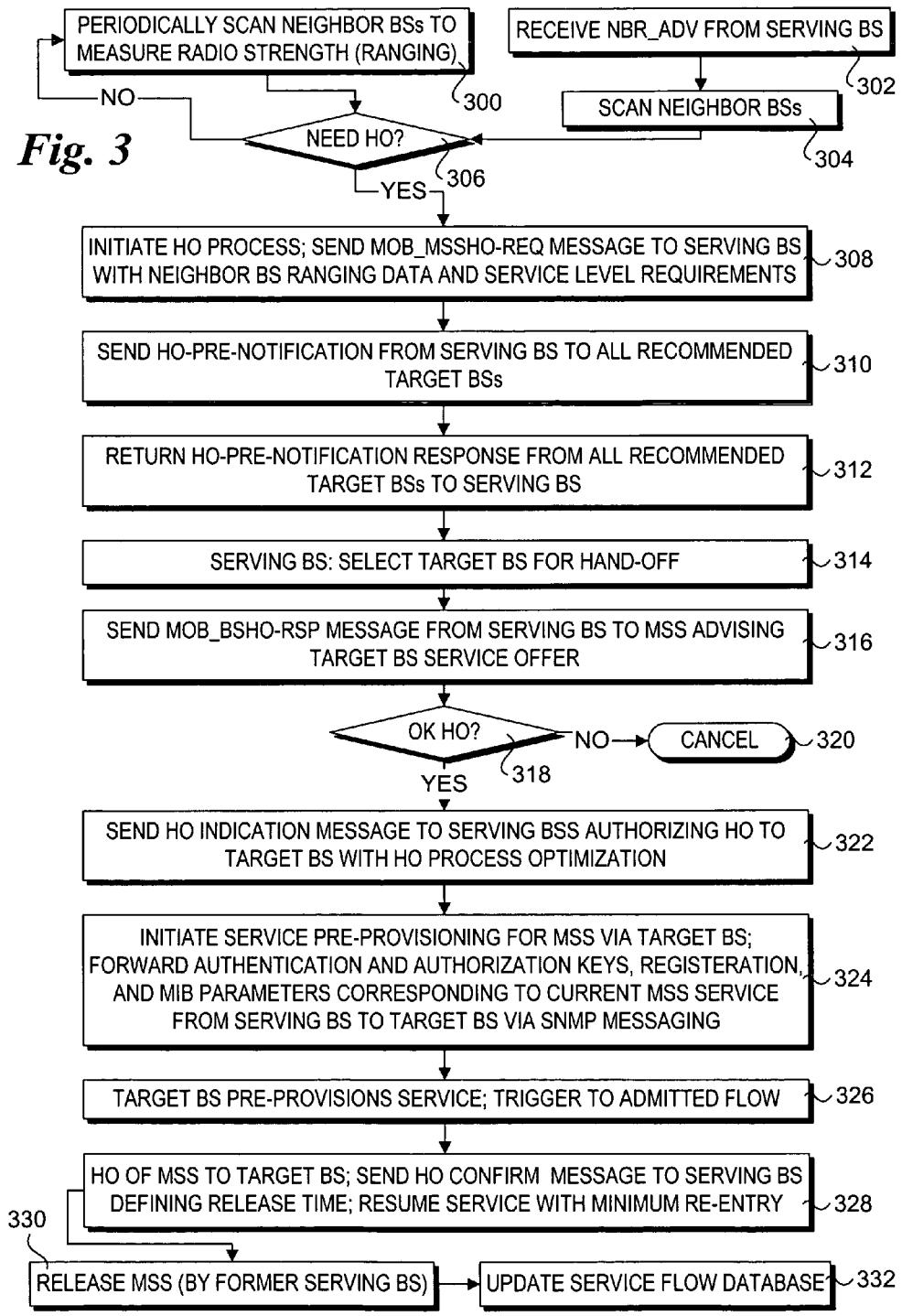
FIG. 3 is a flowchart illustrating operations performed during a fast hand-over process, according to one embodiment of the invention.
Figure 4:
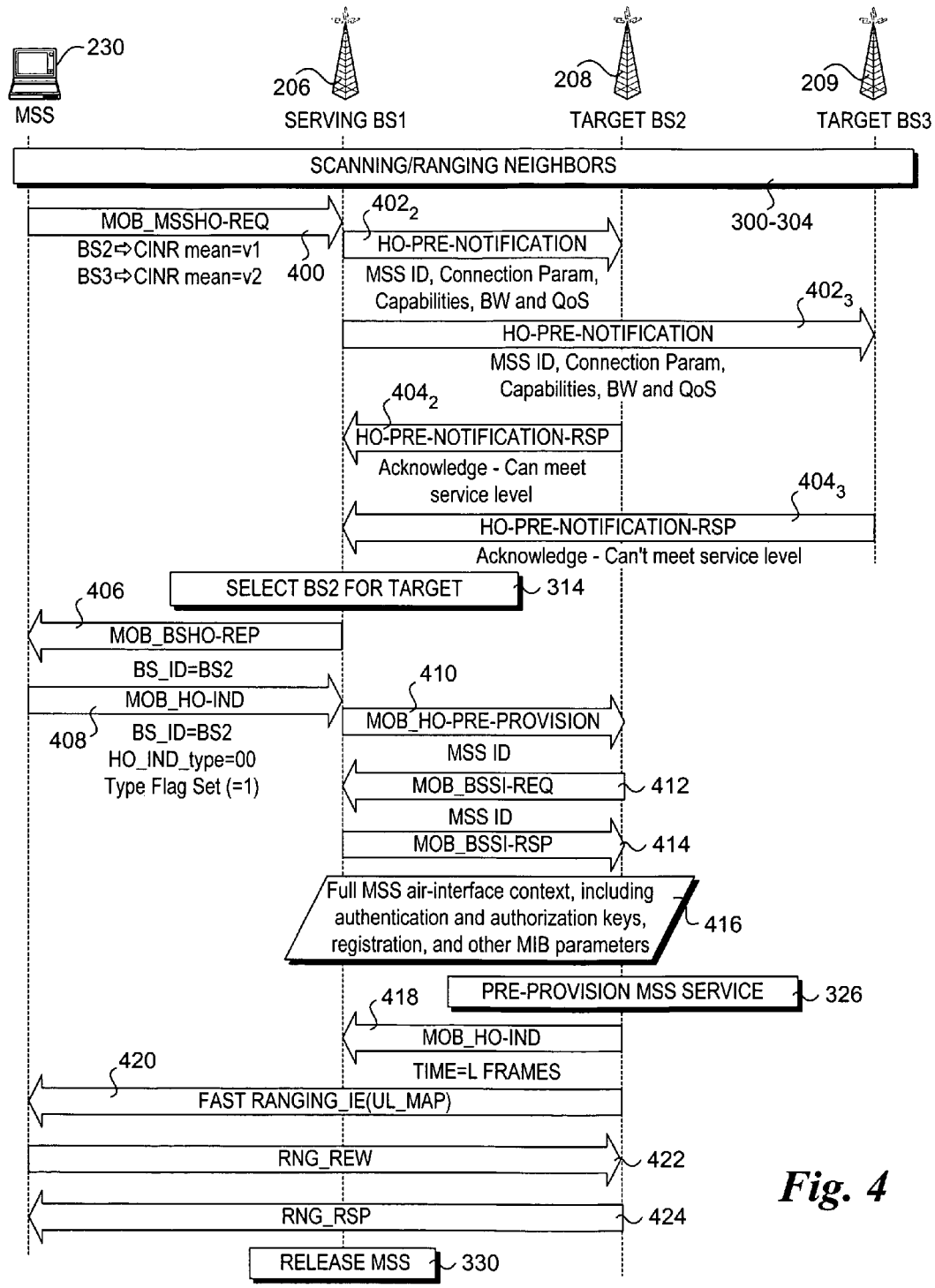
FIG. 4 is a message flow diagram illustrating the sequence of messages transferred between a mobile subscriber station (MSS), serving base station (BS) and target BS's in connection with the operations depicted in the flowchart of FIG. 3.

Operations and logic corresponding to one embodiment of a fast HO process are details in the flowchart of FIG. 3, with corresponding message exchanges shown in FIG. 4. The process begins by determining the existence of a need or benefit to migrating an existing service from a serving BS to a new (target) BS. In general, this may be determined by either an MSS, its serving BS (the BS currently providing WiMAX service to an MSS), or a network management entity.

Cell selection refers to the process of an MSS scanning and/or ranging one or more BSs in order to determine suitability, along with other performance considerations, for network connection or hand-over. The MSS may incorporate information acquired from a MOB_NBR-ADV (mobile neighbor advertisement) message to give insight into the available neighboring BSs for cell selection consideration. If currently connected to a serving BS, an MSS shall schedule periodic scanning intervals or sleep-intervals to conduct cell selection for the purpose of evaluating MSS interest in hand-over to potential target BSs. This procedure does not involve termination of existing connections to a serving BS and their re-opening in a target BS. If ranging a target BS for hand-over, any newly assigned basic and primary CIDs (connection identifiers) are specific to the target BS and do not replace or supplant the basic and primary CIDs the MSS employs in its communication with its serving BS.

In view of these cell selection operations, an MSS periodically scans neighboring BS to measure radio signal reception strength, as depicted in a block 300. In further detail, a carrier-to-interference plus noise ratio (CINR) and/or relative-signal strength indicator (RSSI) are measured to a resolution of 0.5 decibels (dB) using a pre-defined process and message exchange sequence. Prior to performing a scan, an MSS and its serving BS exchange MOB_SCN_REQ (mobile scan request) and MOB_SCN_RSP (mobile scan response) message to set up a timeframe for performing the scan. As another option depicted in a block 302, a serving BS may initiate scanning activities by sending a NBR_ADV (Neighbor Advertisement) message to the MSS. The message informs the MSS of a number of local neighbors from which it might obtain better service. In response to the message, the MSS and serving BS exchange MOB_SCN_REQ and MOB_SCN_RSP messages and then the MSS scans the neighbor BSs identified in the MOB-NBR-ADV message in a block 304.

A hand-over begins with a decision for an MSS to hand-over its air interface, service flow, and network attachment from a serving BS to a target BS. The decision may originate either at the MSS, the serving BS, or the network manager. Typically, the HO decision will be made based on service criteria (e.g., which BS will provide the best air-interface to the MSS) and BS bandwidth availability considerations.

In one embodiment, the decision is made by an MSS in view of the foregoing scanning operations. In response to a most recent set of measurements obtained in either block 300 or 304, the MSS compares the measured CINR and/or RSSI for the serving BS with other nearby (neighbor) BSs to determine if a hand-over process is warranted. If so, as depicted by a decision block 306, the process proceeds to a block 308 in which the HO process is initiated. For illustrative purposes, the following scenario assumes that an MSS 230 is currently serviced by a serving BS 206 (BS1), which has neighbor BSs 208 and 209 (BS2 and BS3), as depicted in the message flow diagram of FIG. 4.

During scanning operations, MSS 204 determined that each of BS 208 and BS 209 had adequate signal strength to serve as potential target base stations. According, in block 208, MSS 204 sends an MOB_MSSHO_REQ (mobile subscriber station hand-over request) MAC management message 400 to serving BS 206 containing a mean CINR and/or RSSI values for each of BS2 and BS3, as well as expected service level requirements. The MOB_MSSHO-REQ MAC management message is use to request a hand-over that is initiated by an MSS. For each neighbor, the message includes a base station identifier (BSID), a preamble index, as BS CINR and/or RSSI mean, a service level prediction, an HO_ID_included_indicator, and HO_ID, and an arrival time difference.

Under its conventional use, the service level prediction comprises a value from 1-4 indicating the level of service the MSS can expect from the BS (which may or may not be obtained through scanning/ranging). For purposes of the current embodiment, the meaning of the service level prediction value is different. Rather than indicating an expected level of service, the service level prediction value is a requested level of service. A value of 3 indicates that the same level of service, as specified by the current AuthorizedQosParamSet (with the serving BS), will be provided by the target BS. A value of 2 indicates a lesser level of service may be accepted. For the purpose of this example, it is assumed a value of 3 is included.

In response to receiving MOB_MSSHO-REQ MAC message 400, serving BS 206 sends a respective HO-Pre-notification message 4022 and 4023 to the target BSs 208 and 209, as shown in a block 310. In one embodiment, it is presumed that the target base stations have not gained any information concerning the MSS during recent scanning/ranging operations. In this instance, each HO-Pre-notification message 402 includes an MSS ID, connection parameters, capabilities, and bandwidth and QoS requirements. This information is used to inform the target BS what services are requested by the MSS. In response to the HO-Pre-notification message, target BSs 208 and 209 return respective HO-Pre-notification-RSP message 4042 and 4043 to serving BS 206, as depicted in a block 312. Each of these messages indicates whether or not the target BS can provide the requested service level. In the illustrated example of FIG. 4, target BS 208 can support the requested service level, while target BS 209 cannot. As an option, a negative acknowledgment message of this type may include information indicating a lesser level of service that may be supported.

In view of the HO-Pre-notification response messages, serving BS 206 selects an appropriate target BS for handover, as depicted in a block 314. In view of this selection, serving BS 206 returns a MOB_BSHO-REP message 406 to MSS 230 identifying the recommended target base station (or stations, if applicable) in a block 316. In the event that no target BS can support the requested service level (or, optionally, can support any service level), the serving BS will return a MOB_BSHO-REP (mobile BS hand-over response) message indicating no target BSs are available for hand-off.

In addition to other fields, a MOB_BSHO-REP message includes an estimated HO start field, a resource remain type field, and an HMAC Tuple. The estimated HO start field contains an estimated number a frames from the frame following reception of the message until the HO may take place. A value of zero means this field should be ignored. The resource remain type field is a flag used to indicate whether the serving BS will retain or delete the connection information of the MSS upon receiving a subsequent MOB-HO-IND message with HO_IND_type=00. If the flag is set to 1, the serving BS will retain the MSS's connection information during the time in a corresponding resource retain time field. If no time is provided, than a system resource retains time timer is used. The HMAC Tuple is used for authentication purposes.

The message also provides information for each recommended neighbor BS, including a neighbor BS-ID, a preamble index, a service level prediction value, and an HO process optimization value. At this stage, the service level prediction value is ignored.

The HO process optimization value comprises a 6-bit value that is used to specify what, if any management messages may be omitted during the subsequent re-entry process associated with re-entering the network with a new base station (the target BS). For each bit location, a value of '0' indicates the associated re-entry management message shall be required, while a value of '1' indicates the message may be omitted. The bit values are as follows:

Bit #0: Omit SBC-REQ/RSP management messages during re-entry processing

Bit #1: Omit PKM-REQ/RSP management message during re-entry processing

Bit #2: Omit REG-REQ/RSP management during re-entry processing

Bit #3: Omit IP address Acquisition management messages during re-entry processing Bit #4: Omit Time of Day Acquisition management messages during re-entry processing Bit #5: Omit TFTP management messages during re-entry processing Bit #6: Full service and operational state transfer or sharing between Serving BS and TargetBS (ARQ, timers, counters, MAC state machines, etc . . . )

In accordance with one embodiment of the service pre-provisioning aspects described below, Bit #6 is set to indicate that pre-provisioning is requested by the MSS. In addition, any of Bits #1-5 may also be set to omit selected messages. In one embodiment, all of Bits #1-6 are set, which results in a minimum amount of messaging between an MSS and target BS to complete a hand-over.

In a decision block 318, the MSS determines if it will accept a hand-over to the target BS (or one of the target BSs) that is/are identified in the MOB_BSHO-REP message. If the answer is no, the HO process is canceled in a block 320. In addition to the illustrative sequence, canceling of an HO process can be initiated at any time by sending a MOB_HO-IND message with the HO cancel option (HO_IND_type=01) or reject option (HO_IND_type=10).

As depicted in a block 322, if the hand-off is approved, MSS 320 sends a MOB_HO-IND (hand-off indication) message 408 to serving BS 206. The HO IND_type is set to 00, with the type flag set (1). This informs the serving BS that the MSS has authorized HO to the selected target BS.

Upon receiving the HO authorization, the serving BS 206 initiates service pre-provisioning for MSS 230 via target BS 208 in a block 324. Pre-provisioning sets up service parameters at the target BS such that upon being completed, service can be switched from the serving BS to the target BS without requiring the re-entry operations that are normally encountered under conventional practice as described in the current IEEE P802.16e/D5 draft specification (September 2004).

The pre-provisioning process begins by sending an MOB-HO_Pre-provision message 410 to the applicable target BS (208 in this example). This informs the target BS to anticipate performing a handover via pre-provisioning, which includes an identification of the MSS (depicted as an MSS ID for illustrative purposes) for the hand-over. In practice, the MSS will typically be identified by its MAC address or CID. Under one embodiment, pre-provisioning operations may actually begin with the HO-Pre-notification message and response discussed above. In this case, the target BS may set aside a pre-assigned air-interface slot in anticipation of a transfer. This type of action might occur if the target BS has significant unused bandwidth.

In response to MOB-HO-Pre-provision message 410, the target BS returns a MOB_BSSI-REQ (base station service information request) SNMP message 412 to serving BS 206. This message requests that the serving BS forward a copy of the MSS connection context (information) to the target BS. The connection context corresponds to the set of information maintained by the serving BS corresponding to the current MSS service (provided by the serving BS). This information includes the service flow data (e.g., parameters, timers, counters, MAC state machines, etc.) for the MSS service, along with authentication and authorization information, as well as registration and other information related to the MSS service, such as optional provider-specific information.

In further detail, the Service Flow Database 210 contains the service flow and the associated QoS information that directs the BS and SS or MSS in the creation of transport connections when a service is provisioned, an SS enters the WiMAX network, or a MSS roams into a BS coverage area. In general, SS/MSSs can be managed directly from an NMS, or indirectly through a BS that functions as an SNMP proxy. In one embodiment, the management information between an MSS and a BS is carried over a Secondary Management CID (connection Identifier) message for a managed MSS. If the Secondary Management CID does not exist, the SNMP message may go through another interface provided by the customer premise equipment.

Rather than having to access a central service flow database for service flow information corresponding to existing subscribers, each base station maintains a local instance of applicable database tables and parameter values corresponding to those subscribers. For example, information corresponding to the various service flows that are currently managed for the clients for a given base station are maintained and updated at that base station. At the same time, an updated snapshot of the database instances stored on the base stations is periodically returned to service flow database 210 so as to keep this central database up to date.

There are three types of service flows defined by the IEEE 802.16e/D5 draft specification (September, 2004), including provisioned service flows, admitted service flows, and active service flows. A provisioned service flow is a service flow that is provisioned but not immediately activated. External triggers are use to transition a provisioned service flow to an admitted service flow. This service flow is typically initiated when an SS enters the network through a network entry procedure, with provision commands being managed by the NMS. As described below, a service flow may also be pre-provisioned.

Under an admitted serve flow, a network resource is reserved through admission control. External triggers are used to transition an admitted service flow to an active service flow. Events similar to "off-hook" in a telephony model are employed to activate an unsolicited grant service (UGS) service flow. Application triggers may also be employed to effect the transition to an active service flow.

An active service flow is a service flow that is active. That is, it is a service flow that is granted uplink and downlink bandwidth for data transport usage. It employs an active QoS parameter set that is a subset of the Admitted QoS parameter set.

Under one embodiment, the applicable service flow data is transferred between base stations using an SNMP transport mechanism. SNMP is based on the manager/agent model consisting of a manager, an agent, a database of management information, managed objects and the network protocol. The manager executes management applications that monitors and control a managed network. The agent is a management software module that resides in a managed device to execute the commands from the manager. The manager and agent use a Management Information Base (MIB) and a relatively small set of commands to exchange information. The MIB is organized in a tree structure with individual variables, such as point status or description, being represented as leaves on the branches.

Returning to FIG. 2, each of base stations 206 and 208 hosts a respective MIB instance 218 and 220. As described below in further detail, an MIB structure is configured as a tree structure that has a hierarchical form similar to a database, wherein each nested portion of the structure defines a storage space again to a database table. The use of this type of structure, in combination with SNMP messages, enables "table" values to be passed between SNMP managed nodes using a standard management interface.

In response to MOB_BSSI-REQ SNMP message 412, serving BS 206 forwards a copy of the service information 416 via an MOB_BSSI-RSP SNMP message 414. Upon receipt of this information, a new service for the MSS is pre-provisioned by the target BS in a block 326. After being pre-provisioned, a trigger is invoked to advance the provisioned service flow to an admitted service flow.

At this point, completion of the hand-over is initiated in a block 328. According to one aspect of the HO completion process, the serving BS is provided with information informing it when it can release the MSS. This is accomplished by sending an MOB_HO-IND message 418 to serving BS 206. The MOB_HO-IND message includes an HO_IND_type=00 and a time value of L frames, indicating that the MSS may be released after L frames have expired.

In conjunction with sending the MOB-HO-IND message, target BS 208 sends a Fast Ranging_IE (information element) 420 containing a current uplink map to MSS 230. This map is used to inform the MSS of current BS target channel availability, and supports faster ranging operations. MSS 230 then sends a RNG_REQ ranging message 422 to target BS 208, which returns an RNG_RSP ranging response message 424 to complete the ranging operation, whereupon service is resumed for MSS 230.

After expiration of L frames as defined in MOB_HO-IND message 418, the former serving BS (206) releases MSS 230, as depicted in a block 330. This completes service operations for MSS 230 by BS 206.

As discussed above, it is desired to resynchronize the data contained in local MIB structures on the base stations with service flow data maintained in service flow database 210. According, at some subsequent point in time, changes to the MIB for the new serving BS (e.g., MIB 220 for BS 208) are forwarded to service flow database 210, as depicted in a block 332.

MIB Data Structure and Operation

Figure 5:
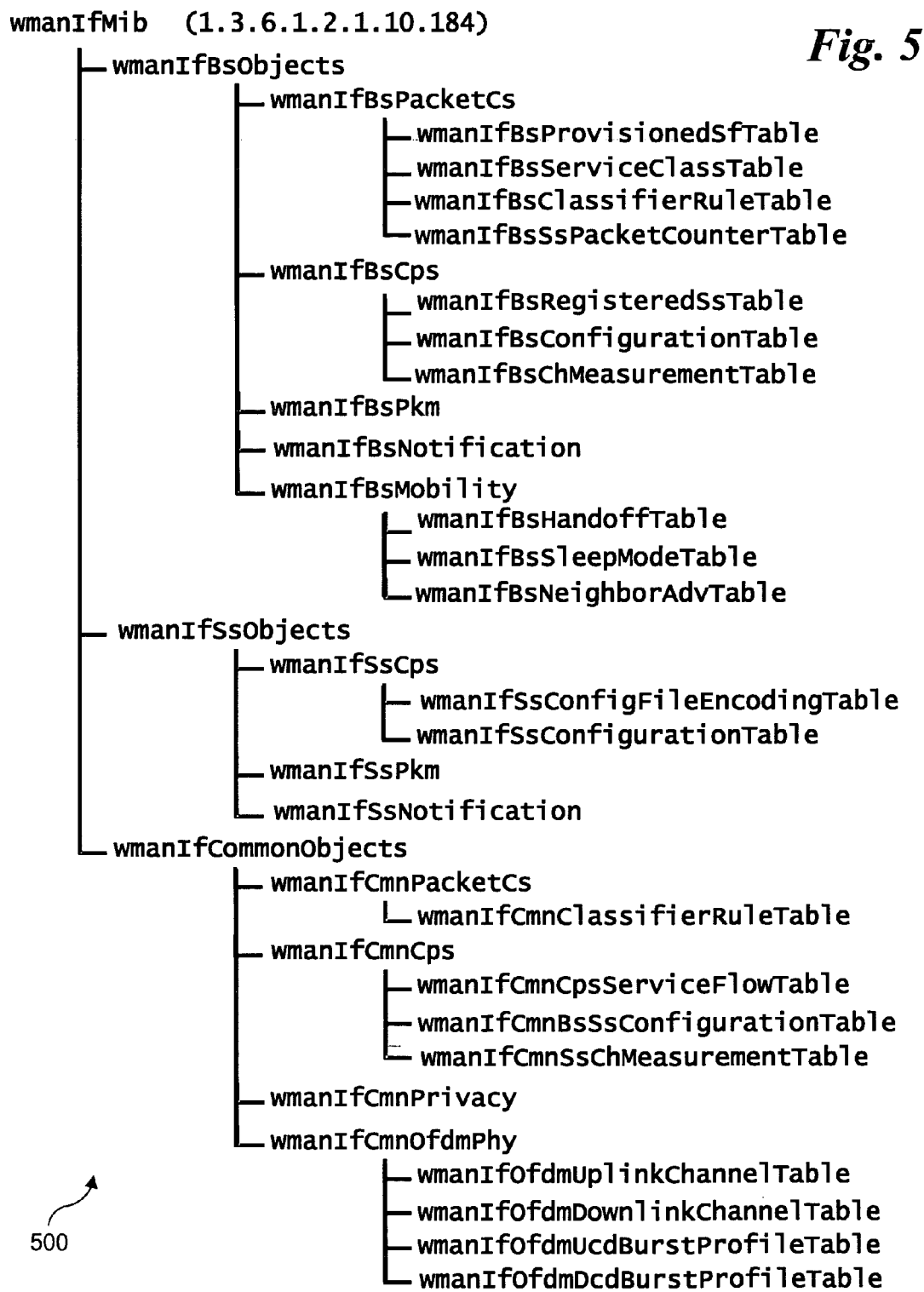
FIG. 5 is a schematic representation of a Management Information (data)Base (MIB) structure employed in the management reference model of FIG. 2 to facilitate provisioning and management operations.

FIG. 5 shows a wmanIfMib (wireless MAN interface) MIB data structure 500, according to one embodiment. The MIB data structure includes multiple MIB objects nested at various levels (groups) in an object hierarchy. At the top of the hierarchy is the wmanIfMib object. The next hierarchy level includes the wmanIfBsObjects, the wmanIfSsobjects, and the wmanIfCommonObjects. The wmanIfBsObjects include a group of managed objects to be implemented by a base station. Similarly, the wmanIfSsobjects include a group of managed objects to be implemented by a subscriber station, including mobile subscriber stations. The wmanIfCommonObjects include a group of common managed objects to be implemented in base stations and the subscriber stations. In connection with other SNMP management operations, wmanIfMib MIB data structure 500 may be implemented as a sub-tree under the Interfaces Group MIB defined in RFC (request for comment) 2863 (i.e., http://www.faqs.org/rfcs/rfc2863.html).

FIG. 6*a* shows an exemplary configuration of a BS provisioned service flow table (wmanIfBsProvisionedSfTable 600), according to one embodiment of the MIB data structure 500. This table contains the pre-provisioned dynamic service flow information to be used to create connections when a user enters the network, or during pre-provisioning operations corresponding to a fast handover. It includes an sfIndex field 602, an SS MAC address field 604, a QoS Index field 606, and a Direction field 608, among other fields (not shown). The sfIndex field 602 is used as an index to link table rows to other tables in the database. A corresponding dynamic service flow state value (provisioned, admitted, or activated) is stored in a linked table (not shown) for each index entry. The SS MAC address field 604 contains a unique SS identifier to associate the dynamic service flow with an SS or MSS. The QoS Index field 606 stores a pointer (index) to the QoS parameter set for the corresponding service flow. The Direction field 608 defines the direction of the service flow (e.g., uplink (UL) or downlink (DL)).

FIG. 6*b* shows an exemplary configuration for a BS service class table (wmanIfBsServiceClassTable 620), according to one embodiment of the MIB data structure 500. This table contains the QoS parameters that are associated with service flows. The illustrated fields include a QoS Index field 622, a Service Class field 624, a Traffic Priority field 626, a Maximum Sustained Data Rate field 628, a Maximum Traffic Burst field 630, a Minimum Reserved Rate field 632, a Tolerated Jitter field 634, and a Maximum Latency field 636. The QoS Index field 622 is analogous to QoS Index field 606, and stores a pointer (index) to the QoS parameter set for the corresponding dynamic service flow. The Service Class field 624 stores a service class name. In one embodiment, the level of service class names are linked to respective sets of QoS parameters, such that a particular set of commonly used QoS parameters may be identified by simply entering a corresponding service class name.

The Traffic Priority field 626 contains a value (e.g., 0 . . . 7) that specifies the priority assigned to a service flow. When two service flows have identical QoS parameters besides priority, the higher priority service flow should be given lower delay and higher buffering preference. The Maximum Sustained Data Rate field 628 specifies the peak data rate of the dynamic service flow in bits per second. The Maximum Traffic Burst field 630 specifies the maximum burst size that can be transported. The Minimum Reserved Rate field 632 is used to specify a rate in bits per second that specifies the minimum amount of data to be transported on the service flow when averaged over time. The Tolerated Jitter field 634 is used to specify the maximum frequency delay variation (jitter) for the service flow. The Maximum Latency field 636 specifies the maximum latency between the reception of a packet by the BS or SS on its network interface and the forwarding of the packet to its radio frequency (RF) interface.

FIG. 6*c* shows an exemplary configuration for a BS classifier rule table (wmanIfBsClassifierRuleTable 640), according to one embodiment of the MIB data structure 500. This table contains rules for the packet classifier to map downlink and uplink packets to the dynamic service flow. The table's fields include an sfIndex field 642 (analogous to sfIndex field 602), a Source IP Address field 644 in which the IP address for a source endpoint is stored, a Destination IP Address field 646, in which the IP address for a destination endpoint is stored, and a Type of Service (TOS)/Differentiated Service Code Point (DSCP) field 648, in which a TOS or DSCP parameter is stored. In the downlink direction, when a packet is received from the network, the classifier in the BS may use the MAC address or IP address to determine which SS the packet shall be forwarded to, and may use TOS or DSCP parameters to select the dynamic service flow with a suitable QoS. In the uplink direction, when a packet is received from the customer premise, the classifier in the SS may use the source/destination MAC address or IP address and port number, TOS/DSCP, Virtual Local Area Network (VLAN) ID to forward the packet to a service flow with the appropriate QoS support.

Figure 6D:
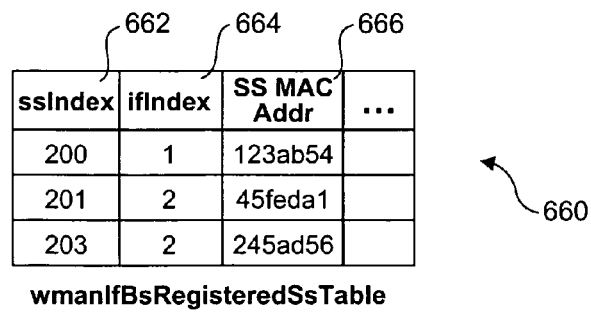
FIG. 6d shows an exemplary configuration for a wireless MAN BS registered subscriber station table corresponding to the wmanIfBsRegisteredSsTable object of FIG. 5, according to one embodiment of the invention.

FIG. 6*d* shows an exemplary configuration of a BS registered SS table (wmanIfBsRegisteredSsTable 660), according to one embodiment of the MIB data structure 500. This table includes information corresponding to registered SSs. The illustrated fields include an ssIndex field 662, which contains an index to a subscriber station identifier, and an ifIndex field 664, which contains in interface index into an MIB instance. An SS MAC address field 666 is used to store the MAC address for a subscriber station.

Figure 6E:
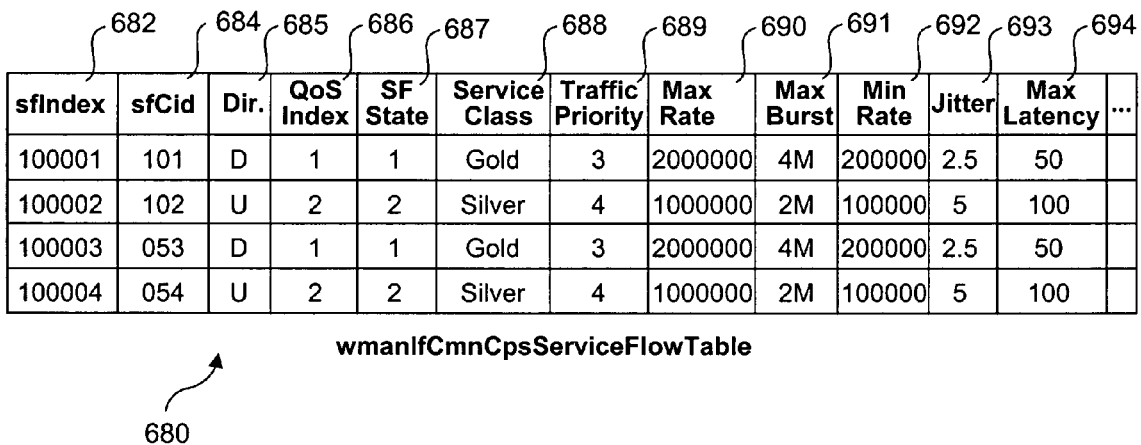
FIG. 6e shows an exemplary configuration for a wireless MAN common service flow table corresponding to the wmanIfCmnCpsServiceFlowTable object of FIG. 5, according to one embodiment of the invention.

FIG. 6*e* shows an exemplary configuration of a common dynamic service flow table (wmanIfCmnCpsServiceFlowTable 680), according to one embodiment of the MIB data structure 500. This table includes a service flow index (sfIndex) field 682, a service flow connection identifier (sfCid) field 684, a Direction Field 685, a QoS Index field 686, and a service flow state field 687. The remaining fields shown are analogous to like-named field in the wmanIfBsServiceClassTable 620, and include a Service Class Name field 688, a Traffic Priority field 689, a Maximum Sustained Data Rate field 690, a Maximum Traffic Burst field 691, a Minimum Reserved Rate field 692, a Tolerated Jitter field 693, and a Maximum Latency field 694. These fields are populated with the same QoS parameters stored in wmanIfBsServiceClassTable 620 corresponding to their associated service class name. In addition to the illustrated fields, the wmanIfCmnCpsServiceFlowTable 680 may contain other fields that are not shown.

Figure 7:
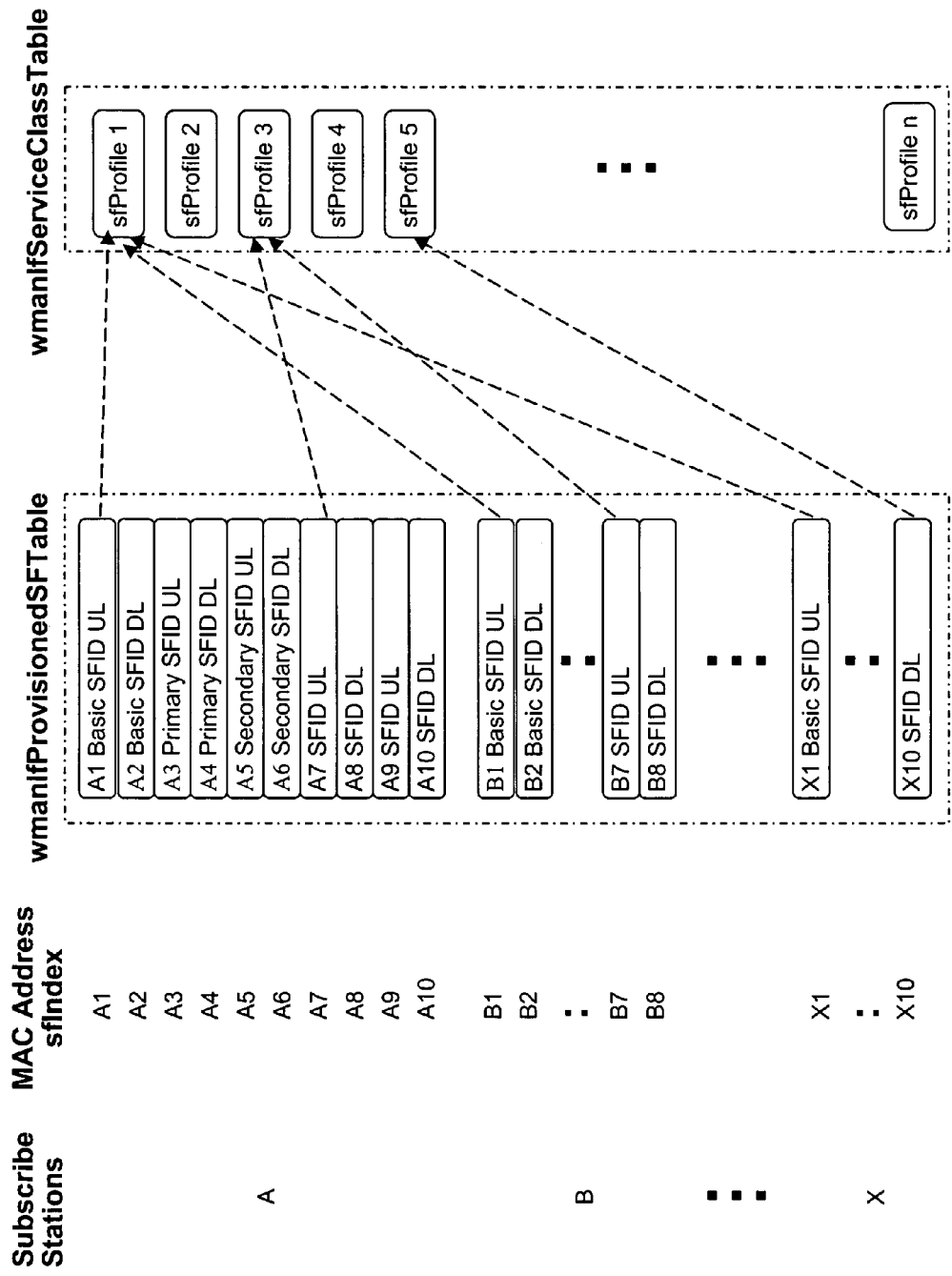
FIG. 7 is a schematic diagram illustrating a scheme via which service classes may be provisioned, according to one embodiment of the invention.

To facilitate the NMS task of provisioning dynamic service flow attributes for hundreds or even thousands of subscriber stations supported by each BS, the concept of Provisioned Service Classes has been devised. FIG. 7 shows one embodiment of a provisioned service class scheme, wherein QoS profiles (e.g., service classes) are created to define associated service flow attributes that can be shared by multiple service flows. For example, Basic CID UL for SSs A1, B1, and X1 uses service profile 1. Service flow attribute profiles can be added or deleted dynamically to meet different QoS demands from subscribers.

Figure 8:
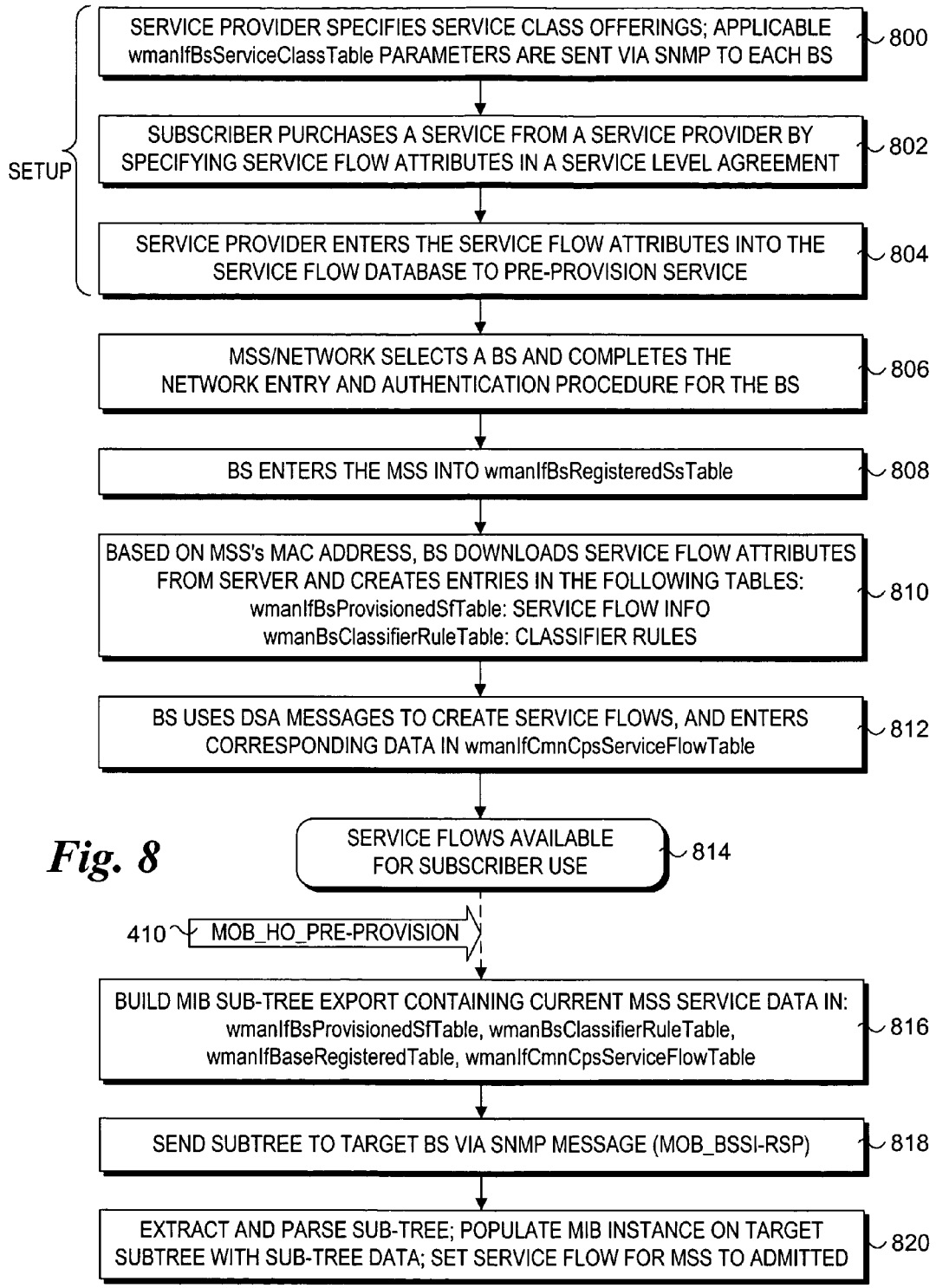
FIG. 8 is a flowchart illustrating operations performed to provision service flows for a mobile subscriber station during a fast hand-off, according to one embodiment of the invention

FIG. 8 shows a flowchart illustrating operations performed to provision dynamic service flows for a subscriber, including pre-provisioning service flows during a hand-off, according to one embodiment of the invention. The first three operations in blocks 800, 802, and 804 are setup operations that are performed in advance to populate applicable database tables and to set up a service subscription. In block 800, a service provider specifies service class offerings that are available for subscription. A master instance of corresponding data is store in various tables, including wmanIfBsServiceClassTable 620 in service flow database 210. In conjunction with this, an instance of the wmanIfBsServiceClassTable 620 is sent to each BS managed via SNMP messaging.

Next, in block 800, the subscriber purchases a broadband wireless service from a service provider by specifying dynamic service flow attributes in a service level agreement (e.g., selecting a service level option). When a customer subscribes to the service, he or she will tell the service provider the dynamic service flow information corresponding to the desired level of service, including the number of UL/DL connections that are requested, along with the data rates and QoS parameters for those connections, and along with what kind of applications (e.g., Internet, voice, video, etc.) he or she intends to run. In response to the subscriber entries, the service provider will pre-provision the services by entering the corresponding dynamic service flow attributes in Service Flow Database 210, as shown in block 8042.

In a block 806, the MSS selects a BS (or a BS is automatically identified by the network) and completes the network entry and authentication procedure for the BS. In response, the BS enters the MSS into its wmanifBsRegisteredSsTable 660 in a block 808 and downloads corresponding service flow attributes, based on the subscriber station's MAC address, from Service Flow Database 210 via server 212 and network 214 in a block 810. The wmanIfBsProvisionedSfTable 600 is then populated with the corresponding service flow information, while corresponding classifier rules are entered in the wmanBsClassifierRuleTable 640. The QoS parameters are specified by linking to an applicable row in wmanIfBsServiceClassTable 620 via a QoS Index.

Figure 9A:
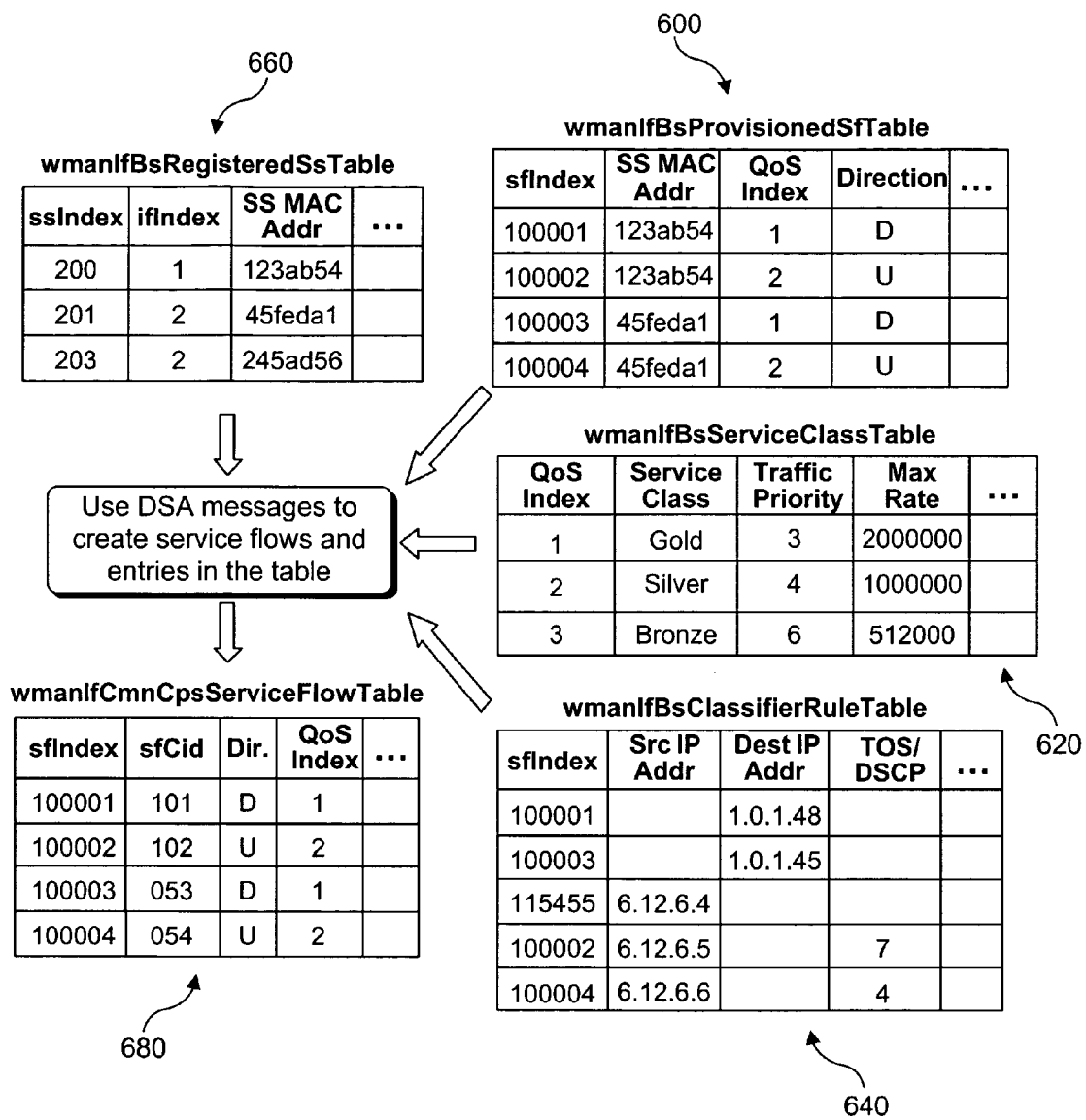
FIG. 9a is a schematic diagram illustrating an exemplary set of table entries made to the tables of FIGS. 6a-e during the service flow provisioning operations of FIG. 8.

FIG. 9a shows exemplary entries in the aforementioned tables 600, 620, 640, 660, and 680 corresponding to a provisioning process. As shown by wmanIfBsProvisionedSfTable 600, two MSS's, identified by respective MAC addresses of 0×123ab54 and 0×45fead1, have been pre-provisioned. Each SS has two dynamic service flows, identified by the values in the sfIndex field, with the associated QoS parameters that are identified by QoSIndex 1 and 2, respectively. As discussed above, a QoSIndex points to a QoS entry in the wmanIfBsServiceClassTable 620 that contains QoS parameters. The wmanIfBsServiceClassTable 620 shown in FIGS. 6 and 9a includes three levels of QoS: Gold, Silver, and Bronze. The sfIndex values point to corresponding entries in wmanBsClassifierRuleTable 640 having the same sfIndex value. The entries in wmanBsClassifierRuleTable 640 indicate which rules shall be used to classify packets on the given dynamic service flow. wmanBsClassifierRuleTable 640 contains an entry that is indexed by sfIndex 100001, indicating a downlink service flow, and contains destination IP address 1.0.1.48. It means that the classifier in the BS will forward the packet with destination IP address 1.0.1.48, received from the RAN 102A, to the service flow with sfIndex 100001. wmanBsClassifierRuleTable 640 also contains an entry that is indexed by sfIndex 100002, indicating a uplink service flow, and contains source IP address 6.12.6.5, and TOS 7. It means that the classifier in the SS will transmit the packet with source IP address 6.12.6.5 and TOS 7 to the service flow with sfIndex 100002.

When the MSS with MAC address 0×123ab54 registers into the BS, the BS creates an entry in wmanIfBaseRegisteredTable 660. Based on the MAC address, the BS will be able to find the service flow information that has been pre-provisioned in wmanIfBsProvisionedSfTable 600, wmanIfBsServiceClassTable 620, and wmanBsClassifierRuleTable 640.

Returning to the flowchart of FIG. 8, in a block 812, the BS uses Dynamic Service Addition (DSA) messaging to the MSS to create dynamic service flows for the corresponding sfIndex entries (e.g., 100001 and 100002), with the pre-provisioned dynamic service flow information. The BS and MSS then create corresponding entries (e.g., two in the present example) in wmanIfCmnCpsServiceFlowTable 680, respectively. wmanIfCmnCpsServiceFlowTable 680 contains both service flow information and QoS parameters. Depending on the network condition, the QoS parameters in wmanIfCmnCpsServiceFlowTable 680 may correspond to a lower service level than what have been pre-provisioned in wmanIfBsProvisionedSfTable 600. The classifier rules will be created in the classifier rules table (not shown) in the BS and, optionally, the MSS. The dynamic service flows will then be available for the subscriber to send data traffic, as depicted by an end block 812. In response to appropriate conditions that invoke corresponding triggers, the pre-provisioned service flows will be advanced to admitted and then active service flows.

The operations depicted toward the bottom of FIG. 8 concern pre-provisioning services in connection with a fast hand-over process, wherein the pre-provisioning occurs at the target BS rather than service flow database 210. As discussed above, the process starts with an MOB_HO-Preprovision message 410, followed by an MOB-BSSI-REQ SNMP message requesting the current service flow context data for the MSS stored on the serving BS. In response in a block 816, the serving BS builds an MIB sub-tree export containing current MSS service data stored in appropriate tables, including wmanIfBsProvisionedSfTable 600, wmanIfBsServiceClassTable 620, wmanBsClassifierRuleTable 640, wmanIfBaseRegisteredTable 660, and wmanIfCmnCpsServiceFlowTable 680.

In a block 818, the serving BS sends an MOB_BSSI-RSP SNMP message containing the MIB sub-tree export. The sub-tree is then extracted by the target BS and parsed. The local MIB instance at the target BS is then populated with the parsed sub-tree data and the service flow is set to the admitted level in a block 820.

An exemplary MSS connection context export is shown in FIG. 9a. The table instances at the top of the figure correspond to MIB 218 hosted by serving BS 206 (as denoted by an appended "S" to each table reference number). Similarly, the table instances at the bottom of the figure correspond to MIB 220 hosted by target BS 208 (as denoted by an appended "T" to each table reference number). Applicable row entries in each of wmanIfBsProvisionedSfTable 600S, wmanBsClassifierRuleTable 640S, wmanIfBaseRegisteredTable 660S, and wmanIfCmnCpsServiceFlowTable 680S are copied to build the MIB sub-tree, which is then sent to target BS 208. Upon extraction, similar entries are added to wmanIfBsProvisionedSfTable 600T, wmanBsClassifierRuleTable 640T, wmanIfBaseRegisteredTable 660T, and wmanIfCmnCpsServiceFlowTable 680T. It is noted that while the table index values (first column of each table) are shown being the same, re-indexing may be required, depending on the MIB implementation scheme.

It is further noted that in one embodiment entries in wmanIfBsServiceClassTable 620 are not included in the export. This is because the same copy of wmanIfBsServiceClassTable 620 is already present on each of the base stations in the network, including serving BS 206 and target BS 208.

According to further aspects of some embodiments, novel security measures are provided to ensure a target BS is authentic. Under the conventional approach, a full re-entry process is performed in connection with a hand-off. Among other operations, the re-entry process performs re-authentication of the MSS, and, optionally, the BS. This process is time-consuming and involves messaging overhead.

As discussed above, the connection context of an MSS connection is transferred from a serving BS to a target BS to effect fast hand-over. Among the fast hand-over options is an option to omit authentication operations during re-entry. However, this potentially could be problematic, as the target BS may be a fraudulent BS that is masquerading as an authentic BS.

In accordance with aspects of selected embodiments, a Trusted Computing Group (TCG) (http://www.trustedcomputinggroup.org) security scheme is implemented to generate, store and retrieve security-related data in a manner that facilitates privacy and security in broadband wireless networks, including IEEE 802.16 defined networks. In the embodiments, a TCG token comprising a trusted platform module (TPM) is employed. Generally, TPM functionality may be embodied as a hardware device (most common) or via software. For example, integrated circuits have been recently introduced to support TPM functionality, such as National Semiconductor's LPC-based TCG-compliant security controller, or similar integrated circuits made by Atmel Corporation and Infineon Technologies AG, for example.

TCG is an industry consortium concerned with platform and network security. The TCG main specification (Version 1.2, October, 2003—hereinafter referred to as the "version 1.2 Specification") is a platform-independent industry specification that covers trust in computing platforms in general. The TCG main specification defines a trusted platform subsystem that employs cryptographic methods when establishing trust. The trusted platform may be embodied as a device or devices, or may be integrated into some existing platform component or components. The trusted platform enables an authentication agent to determine the state of a platform environment and seal data particular to that platform environment. Subsequently, authentication data (e.g., integrity metrics) stored in a TPM may be returned in response to an authentication challenge to authenticate the platform.

Figure 10:
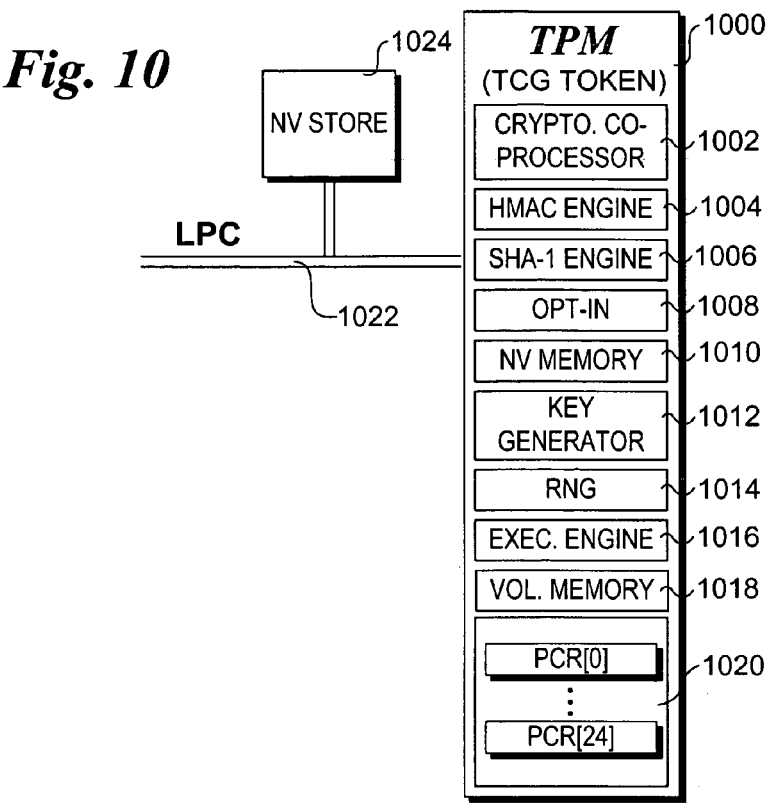
FIG. 10 is a schematic diagram of a trusted platform module (TPM)

Details of a Version 1.2-compliant TPM 1000 and selected associated circuitry are shown in FIG. 10. TPM 1000 provides several functions relating to security and privacy. These include a cryptographic co-processor 1002, an HMAC (Hashing for Message Authentication code) engine 1004, an SHA-1 (security hash algorithm-1) engine 1006, an Opt-In component 1008, non-volatile (NV) memory 1010, a key generator 1012, a random number generator (RNG) 1014, an execution engine 1016, volatile memory 1018, and Platform Configuration Registers (PCRs) 1020. Also provided in one TPM embodiment but not shown are an input/output component and a power detection component. FIG. 10 also shows a low pin count (LPC) bus 1022 and a non-volatile store 1024. In one embodiment, LPC bus 1022 is configured per Intel LPC Interface Specification Revision 1.0, Sep. 29, 1997.

In general, security keys may be generated by key generator 1012 or random number generator 1014. HMAC engine 1004 and SHA-1 engine 1006 are used to perform hashing operations in accordance with the well-known HMAC and SHA-1 hashing algorithms. If desired, a TPM may perform encryption and decryption operations via cryptographic co-processor 1002. More commonly, encryption and decryption operations will be performed by a dedicated cryptographic engine or cryptographic software running on a general-purpose processor.

The root of trust for reporting (RTR) is responsible for establishing platform identities, reporting platform configurations, protecting reported values, and establishing a context for attesting to reported values. The RTR employs a cryptographic identity in order to distinguish configuration reports and enable a challenger to authenticate the platform identity. The platform identity is an embodiment of all the roots of trust. A conventional identity ordinarily is a label that is unique within the context of an application domain. In contrast, a cryptographic identity is universally unique and non-guessable. To create such a cryptographic identity, it must be infeasible to guess an identity given a feedback loop for checking. Additionally, proof of possession of a cryptographic identity should be possible without disclosing it.

Platform uniqueness is achieved through an asymmetric key pair, known as the endorsement key (EK), which is embedded in the TPM. Use of the EK is restricted such that the only external representation of the platform is through aliases, known as attestation identities (and corresponding Attestation Identity Keys (AIKs). Prior to TPM use, a platform identity is created. The EK may be installed during platform manufacturing or generated by a vendor just before a customer takes delivery. TPM and platform manufacturers and their distributors determine the exact point in time when the EK is created. TPM and platform manufacturers are involved in EK creation because they vouch for the validity of the EK and TPM containing the EK.

An AIK is used as an alias for the EK, such that an EK is never revealed. AIKs are employed for signatures and not encryption. A TPM can create a virtually unlimited number of AIKs. Each AIK comprises an RSA 2048-bit asymmetric key pair. Per the Version 1.2 specification, AIKs are only permitted to sign data generated by a TPM. However, this is not limiting, but rather was chosen as part of an overall security policy.

In one embodiment, the AIK key generation capability of TPMs is leveraged for authenticating base stations. Under one scheme, a third-party authenticator, referred to as an authentication server (AS), is used to authenticate a target BS prior to initiating the final phase of a hand-off (the phase during which connection context information is passed to the target BS). Typically, an AS will be managed by a service provider for a given broadband After the AIK key pair has been generated, the BS establishes a connection with the AS in a block 1102. In one embodiment, the connection is established with a local RAN, and the RAN operates as a proxy for the AS. In general, the link between a base station and a RAN may comprise a wired (e.g., copper twisted pair or co-ax), optical (fiber), or wireless link.

Once the link is established, the BS sends the AS baseline authentication information including a BS identifier and the BS AIK public key generated for the AS in a block 1104, followed by termination of the connection in an end block 1108. In general, the BS identifier contains information from which the BS can be uniquely identified. In one embodiment, the BS identifier is included as part of a digital certificate. In their simplest form, digital certificates, which are also referred to as "authentication certificates," contain a public key and a name. As commonly used, a digital certificate also contains an expiration date, information identifying the certifying authority that issued the certificate, a unique identifier (e.g., serial number), and perhaps other information. A digital certificate also contains a digital signature of the certificate issuer. The most widely accepted format for certificates is defined by ITU (International Telecommunications Union)-T X.509 international standard (IETF RFC (Internet Engineering Task Force Request for Comment) 2459). Accordingly, in one embodiment SS sends an ITU-T X.509 certificate (hereinafter referred to as an "X.509" certificate). In addition to X.509 certificates, other types of digital certificates may also be used. As shown in a block 1108, upon receipt of the certificate, the AS stores the BS authentication credentials, including its AIK public key, in a BS credentials table 236 of a local database 238.

During the second phase operations, a target station is authenticated by comparing current authentication credentials with those stored during the authentication initialization phase. As will be apparent, a rogue BS will not have performed any authentication initialization operations, and thus will be easily identified. wireless network. It is also possible for multiple service providers to offer shared services. In this instance, one or more shared AS's may be employed.

In one embodiment, an AS is linked in communication with a RAN via a secure network connection. For example, such a configuration is shown in FIG. 2, wherein an authentication server 232 is coupled to RAN 102 via a secure link 234. In one embodiment, a respective AS is linked to each RAN in the network. In other embodiments, the authentication servers may be distributed across the network, with a given AS being employed for one or more RANs. In yet another embodiment, a single AS is used for the entire network.

In one embodiment, a security scheme employing an AS is implemented using a two-phase process. The first phase, refereed to the initial authentication phase, is used to establish authentication credentials for each BS. The second stage concerns ongoing network hand-over operations that are conductions in an ongoing basis.

Figure 11:
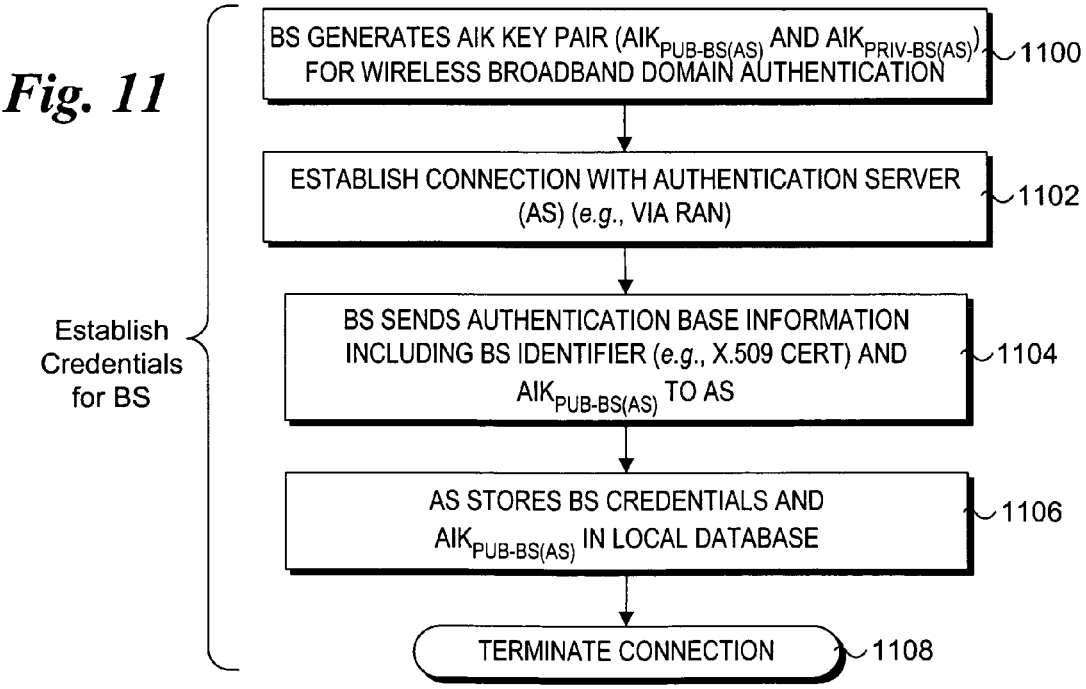
FIG. 11 is a flowchart illustrating operations performed during an initialization operation to establish base station credentials with an authentication server.
Figure 12:
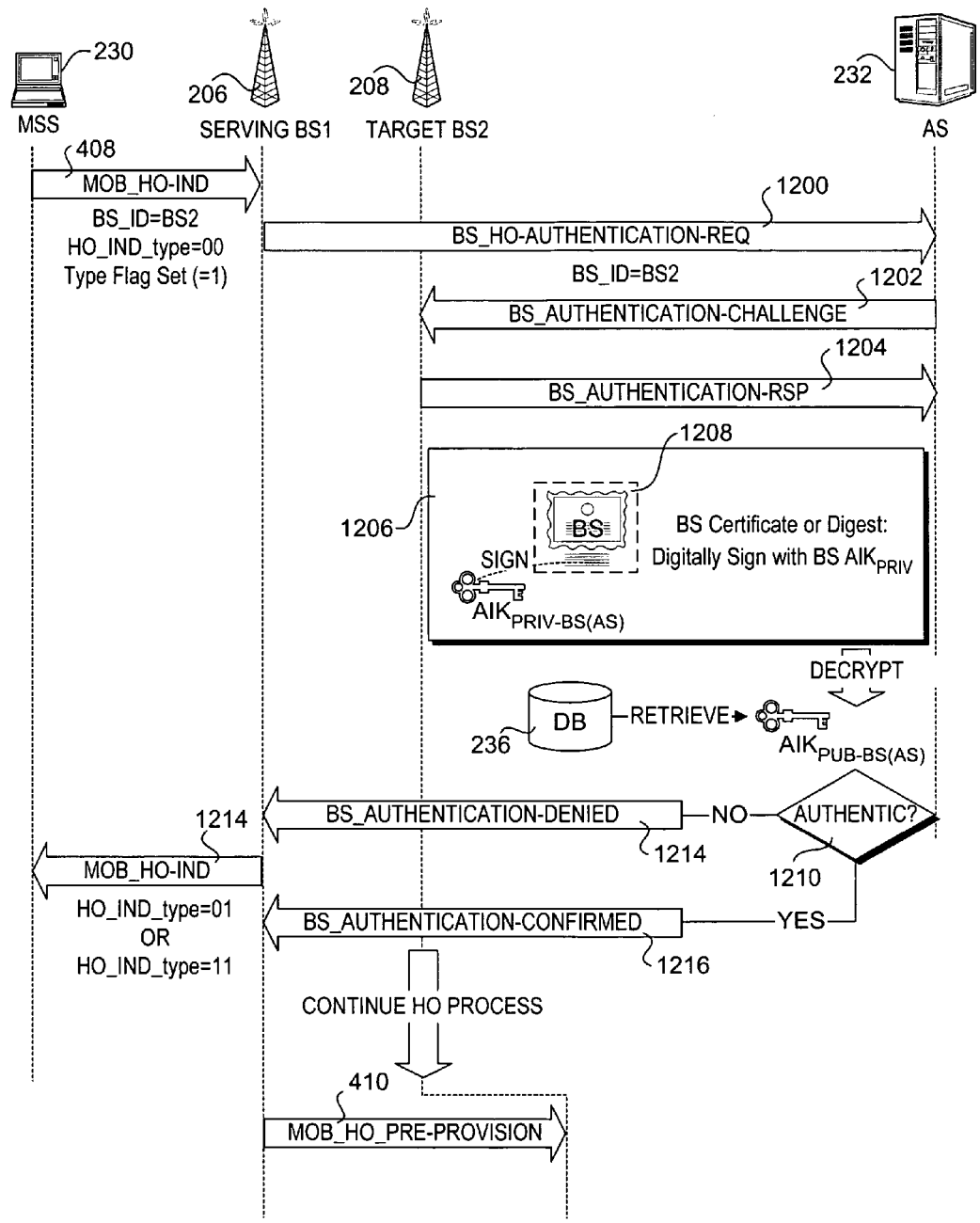
FIG. 12 is a message flow diagram illustrating a sequence of messages used during a target BS authentication process, according to one embodiment of the invention.

A flowchart illustrating operations performed during one embodiment of the initial authentication phase is shown in FIG. 11. This process will generally be performed for each BS within an AS service area (e.g., the portion of the wireless broadband network employing a given AS). In the embodiment illustrated in FIG. 2, each BS coupled to RAN 102 would perform similar operations.

The process starts in a block 1100, wherein the BS generates an AIK key pair comprising asymmetric 2048-bit keys including a private AIK key ($AIK_{PRIV}$) and a public AIK key ($AIK_{PUB}$) that is specific to the AS. Subsequently, the public half of the AIK key pair will be sent to the AS, such that the AS will receive and store the public halves of the AIK key pairs from multiple base stations. Accordingly, the nomenclature used for keys corresponding to unique base stations are depicted with corresponding subscripts, with the generator of the key first and the recipient target for the key following in parenthesis. For example, $AIK_{PUB-SSn(ASm)}$ identifies a public AIK key generated by subscriber station n and targeted for an authentication server m.

Figure 9B:
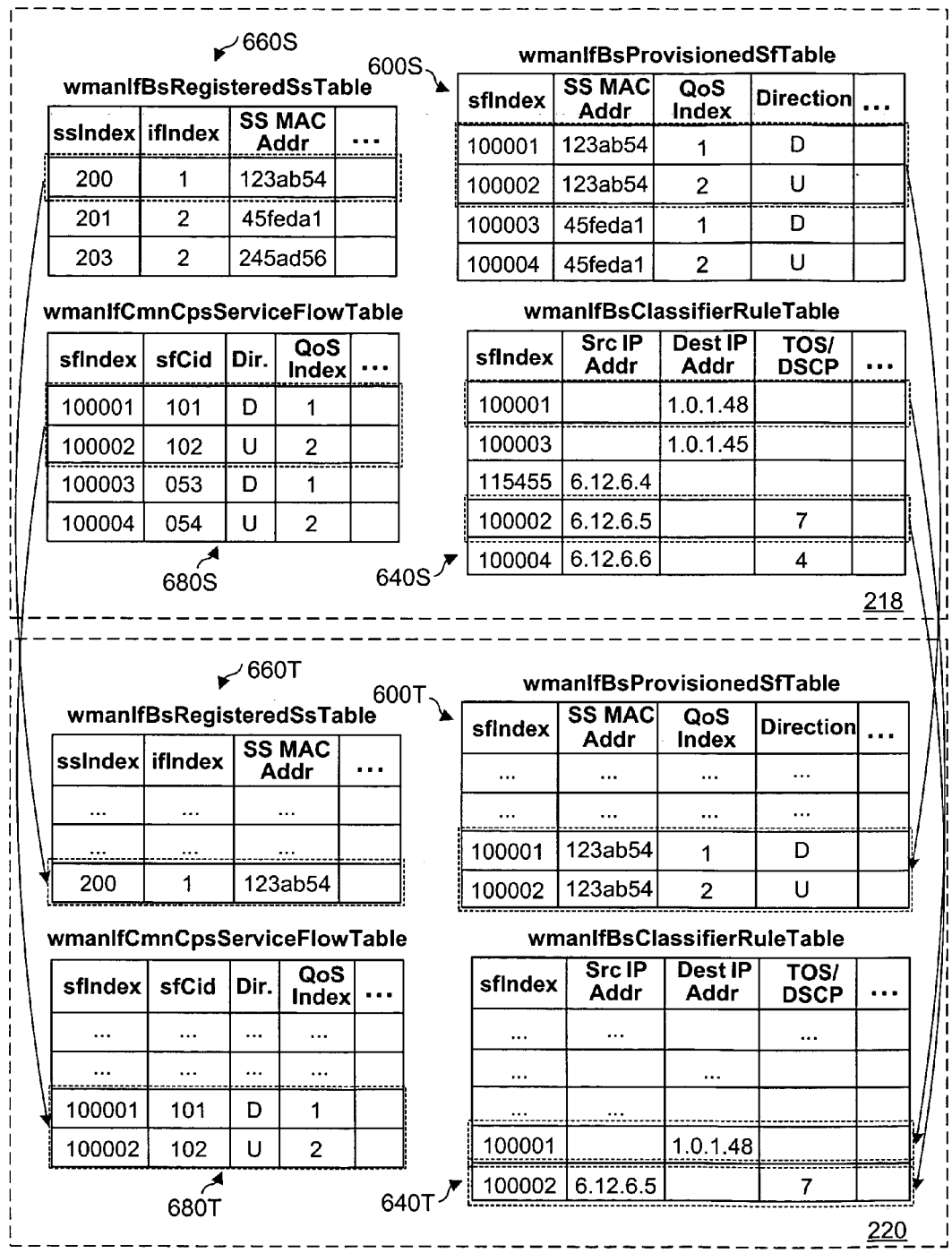
FIG. 9b is a schematic diagram illustrating transfer an exemplary table entries from the MIB at a serving BS to the MIB of a target BS in connection with fast hand-over service flow pre-provisioning operations of FIG. 8.

Details of one embodiment of a message exchange sequence to authenticate a target BS prior to hand-over are shown in FIG. 9. The process begins in response to MOB_HO-IND message 408, which is received at the serving BS (206). This message indicates the MSS has authorized the hand-off. In response, the serving BS requests authentication of the HO target BS (208) by sending a BS_HO-AUTH-REQ (BS hand-over authentication request) message 1200 to AS 232. In general, this message may be sent using a secondary management channel or via a dedicated management link. The BS_HO-AUTH-REQ message includes information identifying the target BS and connection information to communicate with the target BS.

In response to the authentication request, AS 232 sends a BS_AUTH-CHAL (BS authentication challenge) message 1202 to target BS 208. This authentication challenge message is a request to the target to verify its authentication via submission of its authentication credentials. Thus, target BS 208 returns a BS_AUTH-RSP (BS authentication response) message 1204 including target BS 208's credentials 1206 comprising a manifest that is digitally signed with the BS's AIK private key. In one embodiment, the manifest includes a BS certificate 1208. In another embodiment, the manifest comprises a random digest, such as a random number signed with the AIK private key.

Upon receipt of credentials 1206, AS 232 retrieves appropriate records from database 238 corresponding the authentication information provided by target BS 208 during the authentication initialization phase. This includes the public half of BS 208's AIK key pair, which enables AS 232 to verify the digital signature, and thus determine whether BS 208 is authentic. As depicted by a decision block 1210, if the signature cannot be verified, AS 232 returns a BS_AUTH-DEN (BS authentication denied) message 1212 to serving BS 206. This message indicates the target BS cannot be authenticated, and thus the hand-over should be canceled. Accordingly, serving BS 206 sends an MOB_HO-IND message 1214 with an HO_IND_type_value=01, indicating the hand-over is canceled. Optionally, an HO_IND_type value=10 may be used to indicate the hand-over was rejected. In the event a hand-over process is canceled, the foregoing procedure may be repeated one or more times to attempt to hand-over the air-interface to the target BS, or possibly a different BS. In addition, the hand-over process may be re-initiated in view of changed transmission conditions between the MSS and one or more BSs.

If the target BS is authenticated, AS 232 returns a BS_AUTH-CON (BS authentication confirmed) message 1216 to serving BS 206. This informs the serving BS that the target BS is authentic. Thus, hand-over operations are allowed to continue, such as at MOB_HO-PRE-PROVISION message 410 in one embodiment.

Figure 13:
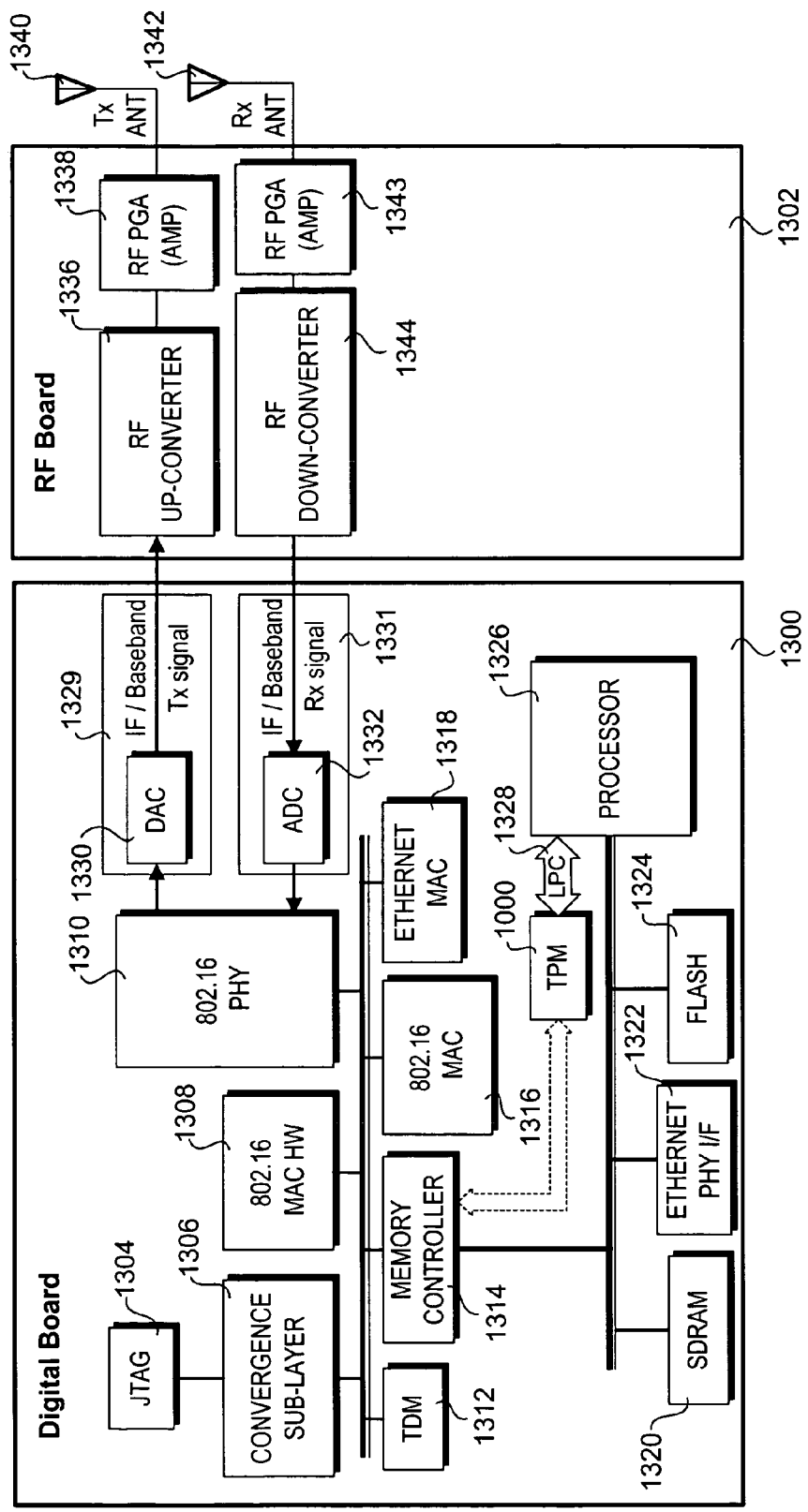
FIG. 13 is a schematic diagram of subscriber station apparatus via which aspects of the embodiments described herein may be practiced.

FIG. 13 shows a block diagram of broadband wireless system architecture suitable for use as a subscriber station or base station under the IEEE P802.16e/D5 draft specification (September 2004). The architecture includes a digital board 1300 and a radio frequency (RF) board 1302. In general, digital board 1300 is responsible for performing various process operations discussed herein. Meanwhile, RF board 1302 handles the generation and reception of RF signals in accordance with the IEEE P802.16e/D5 draft specification (September 2004).

There are various building blocks and components employed by digital board 1300 to facilitate its process operations. These include a Joint Test Action Group (JTAG) component 1304, a convergence sub-layer 1306, an 802.16e MAC hardware block 1308, an 802.16e physical layer transceiver 1310, a TDM component 1312, a memory controller 1314, an 802.16e MAC layer 1316, an Ethernet MAC block 1318, synchronous dynamic random access memory (SDRAM) 1320, an Ethernet physical interface 1322, flash memory 1324, and a processor 1326. The digital board architecture further includes a TPM 1000 coupled to processor 1326 via a low pin count (LPC) bus 1328. In optional configurations not shown, processor 1326 may be coupled to a memory controller hub or an input/output controller hub, which in turn is coupled to TPM 200 via an LPC bus.

Since digital board processes digital signals, while IEEE P802.16e/D5 draft specification (September 2004) transmissions comprise analog signals, means are provided for interfacing between the two signal types. Furthermore, circuitry is needed to produce RF signals having appropriate baseband characteristics. These functions are facilitated by an IF (intermediate frequency)/Baseband transmitter (Tx) signal chip 1329, which includes a digital-to-analog converter (DAC) 1330 and an IF/Baseband receiver (Rx) signal chip 1331 that includes an analog-to-digital converter (ADC) 1332. DAC 1330 chip converts digital signals generated by IEEE P802.16e/D5 draft specification (September 2004) physical layer transceiver 1310 into a corresponding analog signal. This signal is fed into an RF up-converter 1336 on RF board 1302, which up-converts the baseband signal frequency to the carrier frequency. The up-converted signal is then amplified via a programmable gain amplifier (PGA) 1338, which outputs an amplified up-converted signal to a transmitter antenna 1340.

Incoming IEEE P802.16e/D5 draft specification (September 2004) transmission signals are received at a receiver antenna 1342. The received signal is then amplified (as needed) via a PGA 1343 and provided as an input to an RF down-converter 1344, which down converts the received signal to the selected IF/Baseband frequency. The down-converted signal is then converted to a digital signal via ADC chip 1332.

In general, processor 1326 is representative of various types of processor architectures, including, but not limited to general-purpose processors, network processors, and microcontrollers. In addition, processor 1326 is representative of one or more processing elements. The operations performed by the various digital board layers and components are facilitated by execution of instructions on one or more processing elements, including processor 1326. Generally, the instructions may comprise firmware, software, or a combination of the two. In one embodiment, firmware instructions are stored in flash memory 1324. In one embodiment, software instructions are stored in a storage device, such as a disk drive (not shown), that is connected to processor 1326 via a disk controller (not shown). In one embodiment, all or a portion of the software instructions may be loaded as a carrier wave over a network, which interfaces to digital board 1300 via Ethernet physical interface 1322.

Thus, embodiments of this invention may be used as or to support a firmware and/or software modules executed upon some form of processing core or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for performing a fast hand-over in a broadband wireless network, comprising:
   identifying a target base station (BS) to which an air interface between a mobile subscriber station (MSS) and a serving BS is to be handed-off;
   forwarding a first message to the target BS informing the target BS to anticipate a hand-off of the MSS;
   forwarding a second message to the serving BS to request that the serving BS forward connection context information to the target BS;
   forwarding a third message including the connection context information corresponding to a current air interface of a serving BS from the serving BS to the target BS;
   authenticating a target BS prior to handing over the air interface from the serving BS to the target BS by:
      storing an initial set of authentication credentials for each BS on an authentication server;
      submitting an authentication request from the serving BS to the authentication server identifying the target BS;
      sending an authentication challenge to the target BS;
      returning a current set of authentication credentials for the target BS to the AS;
      comparing the initial set of authentication credentials with the current set of authentication credentials to authenticate the target BS; and if the target BS is authenticated,
      returning an authentication confirmation to the serving BS; otherwise
      returning an authentication denial to the serving BS if the target BS is not authenticated; and
   pre-provisioning service corresponding to a migrated air interface to the MSS via the target BS using the connection context information.

2. The method of claim 1, wherein the connection context information includes security data used to support secure communication over the air interface, the method further comprising employing the security data for communication over the migrated air interface, wherein security management messaging is omitted during re-entry of the broadband wireless network.

3. The method of claim 1, wherein the connection context information includes MSS registration data used to register the MSS with the broadband wireless service, and wherein the operations of pre-provisioning the service includes pre-registering the MSS such that the MSS does not have to perform register messaging upon re-entering the broadband wireless network.

4. The method of claim 1, wherein the broadband wireless network comprises a WiMAX network operated in conformance with an IEEE (Institute of Electrical and Electronic Engineering) 802.16-based wireless broadband standard.

5. The method of claim 1, wherein the target BS is authenticated by an authentication server (AS) communicatively-coupled to a radio access node (RAN) for each of the serving and target BSs.

6. The method of claim 1, further comprising:
generating an attestation identity key (AIK) key pair including a public AIK key and a private AIK key using a trusted platform module (TPM) at the target BS;
sending the public AIK key to the authentication server during a credential initialization operation; and, in response to the authentication challenge,
sending data digitally signed with the private AIK key to the AS; and
using the public AIK to decrypt the digital signature and authenticate the target BS.

7. The method of claim 1, further comprising:
using Simple Network Management Protocol (SNMP) messaging to forward the connection context information from the serving BS to the target BS.

8. The method of claim 1, further comprising:
storing subscriber service flow provisioning information in a service flow database managed by a broadband wireless service provider;
storing a sub-set of the subscriber service flow provisioning information in a Management Information Base (MIB) at the serving BS and the target BS;
storing parameters corresponding to a current connection context for the MSS-to-serving BS air interface in the MIB at the serving BS;
generating an MIB sub-tree structure containing the parameters corresponding to a current connection context;
sending the MIB sub-tree structure from the serving BS to the target BS;
extracting the parameters corresponding to the current connection context from the MIB sub-tree; and
inserting the parameters corresponding to the current connection context into the MIB at the target BS to pre-provision the service.

9. The method of claim 8, further comprising:
sending a copy of the parameters that are inserted into the MIB at the target BS to a central service flow database after the hand-over is completed.

10. The method of claim 1, further comprising:
forwarding a fourth message to the serving BS informing the serving BS when the serving BS when can release the MSS; and
releasing the MSS at the serving BS after the hand-over is completed.

11. The method of claim 1, wherein identification of the target BS to which the air interface is to be handed off to is determined by the serving BS.

12. The method of claim 1, wherein identification of the target BS to which the air interface is to be handed off to is determined by the MSS.

13. The method of claim 1, further comprising:
sending a hand-over pre-notification message to at least one target BS being considered for a hand-over, the pre-notification message containing a set of connection parameters and Quality of Service (QoS) level information relating to a requested QoS level to be provided after the hand-over; and
receiving a hand-over pre-notification response message from each of the at least one target BS, each hand-over pre-notification response message indicating whether that target BS can provide the requested QoS level.

14. A computer-readable medium encoded with computer-executable instructions, which if executed at a base station (BS) of a broadband wireless network perform operations comprising:
maintaining connection context information corresponding to a current air interface to a mobile subscriber station (MSS) for which the base station is providing a current service flow, wherein the connection context information includes security data used to support secure communication over the air interface;
forward a first message to request to hand-over the air interface to a target BS;
in response to the first message to request to hand-over the air interface to a target BS, forwarding a second message to request that the serving BS forward the connection context information to the target BS;
authenticating the target BS prior to handing over the air interface from the serving BS to the target BS by:
storing an initial set of authentication credentials for each BS on an authentication server;
submitting an authentication request from the serving BS to the authentication server identifying the target BS;
sending an authentication challenge to the target BS;
returning a current set of authentication credentials for the target BS to the authentication server;
comparing the initial set of authentication credentials with the current set of authentication credentials to authenticate the target BS; and if the target BS is authenticated,
returning an authentication confirmation to the serving BS; otherwise
returning an authentication denial to the serving BS if the target BS is not authenticated; and
forwarding a third message including connection context information corresponding to the current air interface to the target BS.

15. The computer-readable medium of claim 14, wherein the instructions, which if executed at the base station (BS) of the broadband wireless network are further to perform operations comprising:
storing connection context information corresponding to current service flows provided by the base station in a Management Information Base (MIB);
generating an MIB sub-tree containing connection context information pertaining to an MSS air interface for which a hand-over is requested; and
sending a Simple Network Management Protocol (SNMP) message containing the MIB sub-tree to the target BS.

16. The computer-readable medium of claim 14, wherein the instructions, which if executed at the base station (BS) of the broadband wireless network are further to perform operations comprising:
identifying a target base station (BS) to which the current air interface is to be handed-off.

17. The computer-readable medium of claim 14, wherein the instructions, which if executed at the base station (BS) of the broadband wireless network are further to perform operations comprising:

receiving a hand-off request from the MSS identifying one or more potential target BSs to which the current air interface may be handed-over;

sending a hand-off pre-notification message to the one or more potential target BSs, each hand-off pre-notification message containing information identifying a Quality of Service (QoS) level requested to be provided by a target BS after a hand-off to that target BS;

receiving a hand-off pre-notification response message from the one or more potential target BSs, each hand-off pre-notification response message containing information identifying whether the target BS sending the response can support the QoS level that is requested; and selecting a target base station (BS) to which the current air interface is to be handed-off in view of the hand-off pre-notification response messages.

18. The computer-readable medium of claim 14, wherein the instructions, which if executed at the base station (BS) of the broadband wireless network are further to perform operations comprising:

sending a target BS authentication request to an authentication server (AS);

receiving one of an authentication confirmation or authentication denial message from the AS; and in response thereto, sending one of a hand-over cancellation or hand-over rejection message to the MSS if an authentication denial message is received; otherwise continuing hand-over operations to complete hand-over of the air interface to the target BS if an authentication confirmation message is received.

19. The computer-readable medium of claim 14, wherein the instructions, which if executed at the base station (BS) of the broadband wireless network are further to perform operations comprising:

retrieving a public attestation identification key (AIK) key comprising the public key half of an AIK key pair generated by a trusted platform module (TPM) hosted by BS, the AIK pair further including a private AIK key;

sending the public AIK key to an authentication server (AS), and in response to an authentication challenge issued by the AS to the apparatus, generating a manifest;

retrieving the private AIK key;

digitally signing the manifest with the AIK private key; and sending the digitally-signed manifest to the AS.

20. An apparatus, comprising:

a processor;

a trusted platform module (TPM) operatively coupled to the processor;

a plurality of broadband wirelesss network components compliant with the IEEE (Institute of Electronic and Electrical Engineers) P802.16-based broadband wireless standard, operatively coupled to the processor, the broadband wireless components to facilitate communications over a IEEE P802.16-basad broadband wireless network; and at least one storage device, operatively coupled to the processor and having instructions stored therein, which when executed by the processor perform operations including:

maintaining connection context information corresponding to a current air interface to a mobile subscriber station (MSS) for which the apparatus is providing a current service flow;

in respones to a first message to request to hand-over the air interface to a target BS, forwarding a second message to request that the BS forward the connection context information to the target BS;

forwarding a third message including connection context information corresponding to the current air interface to the target BS; and authenticating the target BS prior to handing over the air interface from the serving BS to the target BS by;

storing an initial set of authentication credentials for each BS on an authentication server;

submitting an authentication request from the serving BS to the authentication server identifying the target BS;

sending an authentication challenge to the target BS;

return a current set of authentication credentials for the target BS to the authentication server;

comparing the initial set of authentication credentials with the current set of authentication credentials to authenticate the target BS; and if the target BS is authenticated, returning an authentication confirmation to the serving BS; otherwise returning an authentication denial to the serving BS if the target BS is not authenticated.

21. The apparatus of claim 20, wherein execution of the instructions performs further operations including:

storing connection context information corresponding to current service flows provided by the apparatus in a Management Information Base (MIB);

generating an MIB sub-tree containing connection context information pertaining to an MSS air interface for which a hand-over is requested; and sending a Simple Network Management Protocol (SNMP) message containing the MIB sub-tree to the target BS.

22. The apparatus of claim 20 wherein execution of the instructions perform further operations including, causing the TPM to generate an attestation identification key (AIK) key pair including public AIK key and a private AIK key;

sending the public AIK key to an authentication server (AS), and in response to an authentication challenge issued by the AS to the apparatus, generating a manifest;

digitally signing the manifest with the AIK private key; and sending the digitally-signed manifest to the AS.

23. The apparatus of claim 20, wherein execution of the instructions performs further operations including:

receiving information from one of the MSS or one or more target BSs identifying availability and Quality of Service (QoS) levels that can be expected to be provided by the one or more target BSs if the current air interface is handed-off to one of the target BSs; and identifying a target base station (BS) to which the current air interface is to be handed-off in view of the availability and QoS information received.

24. A system, comprising:

a radio access node (RAN); and a plurality of base stations (BS), each communicatively coupled to the RAN, each BS comprising:

a processor;

a plurality of broadband wireless network components compliant with the IEEE (Institute of Electronic and Electrical Engineers) P802.16-based broadband wireless standard, operatively coupled to the processor, the broadband wireless components to facilitate communications over a IEEE P802.16-based broadband wireless network; and at least one storage device, operatively coupled to the processor and having instructions stored therein, which when executed by the processor perform operations including:

maintaining connection context information corresponding to a current air interface to a mobile subscriber station (MSS) for which the BS is providing a current service flow;

in response to a first message to request to hand-over the air interface to a target BS, forwarding a second message to request that the BS forward the connection context information to the target BS;

authenticating a target BS prior to handing over the air interface from the serving BS to the target BS by:

storing an initial set of authentication credentials for each BS on the authentication server;

submitting an authentication request from the serving BS to the authentication server identifying the target BS;

sending an authentication challenge to the target BS;

returning a current set of authentication credentials for the target BS to the AS;

comparing the initial set of authentication credentials with the current set of authentication credentials to authenticate the target BS; and if the target BS is authenticated, returning an authentication confirmation to the serving BS; otherwise returning an authentication denial to the serving BS if the target BS is not authenticated; and forwarding a third message including connection context information corresponding to the current air interface to the target BS.

25. The system of claim 24, further comprising:

an authentication server, communicatively-coupled to the RAN, the authentication server to store BS authentication data and to provide BS authentication services.

26. The system of claim 24, further comprising:

a network management system, communicatively-coupled to the RAN via a network, the network management system to manage each of the base stations using Simple Network Management Protocol (SNMP) messaging.

27. The system of claim 24, further comprising:

a service flow database, communicatively-coupled to the RAN via a network;

a Management Information Base (MIB) instance hosted by each of the BSs, each MIB instance to store service flow data related to MSSs currently being served by the BS hosting that MIB instance.

* * * * *